(12) United States Patent
Sugiyama

(10) Patent No.: US 7,804,566 B2
(45) Date of Patent: Sep. 28, 2010

(54) CELLULOSE ACYLATE FILM, POLARIZING PLATE AND LIQUID CRYSTAL DISPLAY DEVICE

(75) Inventor: Susumu Sugiyama, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 558 days.

(21) Appl. No.: 11/727,921

(22) Filed: Mar. 29, 2007

(65) Prior Publication Data
US 2007/0231507 A1     Oct. 4, 2007

(30) Foreign Application Priority Data
Mar. 31, 2006   (JP) .............................. 2006-100169

(51) Int. Cl.
*G02F 1/1335*   (2006.01)
(52) U.S. Cl. .................... 349/117; 349/96; 349/118; 349/119; 349/187; 428/1.31; 428/1.33
(58) Field of Classification Search ............... 349/96, 349/117–119; 428/1.31
See application file for complete search history.

(56) References Cited

U.S. PATENT DOCUMENTS

| | | | | |
|---|---|---|---|---|
| 7,501,167 | B2* | 3/2009 | Sugiyama | 428/1.33 |
| 2006/0062935 | A1* | 3/2006 | Murakami | 428/1.31 |
| 2007/0040963 | A1* | 2/2007 | Maruyama et al. | 349/96 |
| 2009/0027599 | A1* | 1/2009 | Ohgaru et al. | 349/96 |
| 2009/0033833 | A1* | 2/2009 | Aminaka | 349/68 |

FOREIGN PATENT DOCUMENTS

| | | | |
|---|---|---|---|
| EP | 0 911 656 A2 | | 4/1999 |
| JP | 2587398 B2 | | 3/1997 |
| JP | 2002-71957 A | | 3/2002 |
| JP | 2003-270442 A | | 9/2003 |
| JP | 2004-277581 A | | 10/2004 |
| WO | WO 2005081642 A2 | * | 9/2005 |

* cited by examiner

*Primary Examiner*—David Nelms
*Assistant Examiner*—Thanh-Nhan P Nguyen
(74) *Attorney, Agent, or Firm*—Buchanan Ingersoll & Rooney PC

(57) ABSTRACT

A cellulose acylate film, which has a film thickness of from 20 to 70 μm and an elastic modulus of from 3.5 to 10 GPa in at least one direction of a film casting direction and a width direction.

4 Claims, 1 Drawing Sheet

CELLULOSE ACYLATE FILM, POLARIZING PLATE AND LIQUID CRYSTAL DISPLAY DEVICE

BACKGROUND OF THE INVENTION

1. Field of the Invention

The present invention relates to a cellulose acylate film, a polarizing plate using the same, and a liquid crystal display device.

2. Description of the Related Art

Liquid crystal display devices have found wide range of uses for monitors of personal computers or portable devices, and television sets from various advantages of low voltage/low consumption power, capabilities of the reduction of size/the reduction of the film thickness, and the like. For such liquid crystal display devices, various modes have been proposed according to the orientation states of liquid crystal molecules in each liquid crystal cell. However, conventionally, the TN mode in which liquid crystal molecules are oriented to be twisted at about 90° from the lower substrate toward the upper substrate of a liquid crystal cell has been the main stream.

Generally, a liquid crystal display device includes a liquid crystal cell, an optical compensation sheet, and a polarizing film. The optical compensation sheet is used in order to eliminate image coloration or enlarge the viewing angle. A stretched birefringent film or a film obtained by coating a liquid crystal on a transparent film is used. For example, Japanese Patent No. 2587398 discloses the following technology: a discotic liquid crystal compound is coated on a triacetyl cellulose film, and oriented and fixed, resulting in an optical compensation sheet, and the optical compensation sheet is applied to a TN mode liquid crystal cell, thereby to enlarge the viewing angle. However, a stringent requirement is imposed on the viewing angle dependency of a liquid crystal display device for use in a television set which is supposed to be seen through the large screen at various angles. Thus, even with the foregoing technique, the requirement cannot be satisfied. For this reason, a study has been conducted on the liquid crystal display devices of the IPS (In-Plane Switching) mode, the OCB (Optically Compensatory Bend) mode, the VA (Vertically Aligned) mode, and other modes than the TN mode. Particularly, the VA mode has received attention as for use in a liquid crystal display device for a television set because of its high contrast, and a relatively high manufacturing yield.

Incidentally, the cellulose acylate film has a feature of higher optical isotropy (low retardation value) as compared with other polymer films. Therefore, for the purpose requiring the optical isotropy, for example, for the components of a polarizing plate, a cellulose acylate film is commonly used.

On the other hand, the optical compensation sheet (phase film) of a liquid crystal display device is, conversely, required to have the optical anisotropy (high retardation value). Particularly, the optical compensation sheet for the VA mode is required to have a in-plane retardation (Re) of 30 to 200 nm, and a retardation in a thickness-direction of 70 to 400 nm. Therefore, commonly used optical compensation sheets have been synthetic polymer films having a high retardation value such as a polycarbonate film and a polysulfone film.

As described above, in the technical field of optical materials, there has been the following general principle: when a polymer film is required to have an optical anisotropy (high retardation value), a synthetic polymer film is used; whereas, when the film is required to have an optical isotropy (low retardation value), a cellulose acylate film is used.

EP 0911 656A2 proposes a cellulose acetate film having a high retardation value which can be also used for the purpose requiring the optical anisotropy, which disproves the conventional general principle. In this proposal, in order to achieve a high retardation value with cellulose triacetate, an aromatic compound having at least two aromatic rings is added, and a stretching treatment is carried out. It is generally known that cellulose triacetate is a polymer material which is difficult to stretch, and is difficult to increase in birefringent index. However, simultaneous orientation of an additive with a stretching treatment enables the increase in birefringent index. Thus, a high retardation value is implemented. This film can also serve as a protective film of a polarizing plate, and hence has an advantage in capability of providing a low-cost and thin liquid crystal display device.

JP-A-2002-71957 discloses an optical film containing a cellulose ester which has an acyl group having 2 to 4 carbon atoms as a substituent, and in which the expressions $2.0 \leq A+B \leq 3.0$ and $A<2.4$, where A represents the substitution degree of an acetyl group, and B represents the substitution degree of a propionyl group or a butyryl group, are simultaneously satisfied, characterized in that $0.0005 \leq Nx-Ny \leq 0.0050$ is further satisfied, where Nx represents the refractive index in the direction of the slow axis, and Ny represents the refractive index in the direction of the fast axis, at a wavelength of 590 nm.

JP-A-2004-277581 discloses a cellulose ester film containing a cellulose ester resin of which the degree of substitution of a hydroxyl group simultaneously satisfies the following expressions (1) and (2), and containing an ultraviolet absorbing polymer including and derived from an ultraviolet absorbing monomer of a specific structure in an amount of 1 to 20 parts by mass per 100 parts by mass of the cellulose ester resin, and characterized by being stretched so that the retardation value in the in-plane direction R0 is 20 to 100 nm, and the retardation value in the thickness direction Rt is 70 to 300 nm:

$$2.4 \leq A+B \leq 2.8 \qquad \text{Expression (1)}$$

$$1.4 \leq A \leq 2.0 \qquad \text{Expression (2)}$$

[where in the formula, A represents the substitution degree of an acetyl group; and B, the substitution degree of an acyl group having 3 or 4 carbon atoms.]

JP-A-2003-270442 discloses a polarizing plate for use in a VA mode liquid crystal display device, the polarizing plate having a polarizing film, and an optically biaxial mixed fatty acid cellulose ester film, characterized in that the optically biaxial mixed fatty acid cellulose ester film is disposed between the liquid crystal cell and the polarizing film

SUMMARY OF THE INVENTION

As with the methods disclosed in the foregoing documents, use of a cellulose acylate film is effective in that a low-cost and thin liquid crystal display device can be obtained. However, with a decrease in thickness of the cellulose acylate film, sagging, wrinkles, and bending of the film become more likely to occur. This results in the occurrence of a problem of difficult handling. This problem becomes remarkable particularly upon processing into a polarizing plate, or upon bonding with a liquid crystal display device.

It is an object of the invention to provide a cellulose acylate film which is excellent in developability of the in-plane and thickness-direction retardation, is thin, and is easy to handle for manufacturing and processing. It is a second object of the invention to provide a liquid crystal display device which less shows changes in viewing angle characteristics, and a polarizing plate for use in the liquid crystal display device, using the cellulose acylate film.

The present inventors conducted a close study. As a result, they found the following. By controlling the elastic modulus of the cellulose acylate film within a specific range, i.e., to be a higher elastic modulus than that of a conventionally used film, it is possible to resolve the foregoing problems resulting from the reduction in film thickness, and it is possible to provide a cellulose acylate film which is easy to handle for manufacturing and processing. Simultaneously, they found a method for manufacturing such a thin and high elastic modulus cellulose acylate film while resolving the foregoing problems, and further, without causing rupture or haze.

As for the elastic modulus of the cellulose acylate film, conventionally, the ones of about 2 to 3.5 GPa have been widely used. However, the present inventors found the following fact. By setting the elastic modulus at 3.5 GPa or more, sagging, wrinkles, and bending upon bonding to a liquid crystal display device do not occur. On the other hand, when the elastic modulus exceeds 10 GPa, chips may occur upon punching of slits in the film or a polarizing plate. Namely, by setting the elastic modulus at 3.5 to 10 GPa, it is possible to achieve the objects of the invention. The elastic modulus is preferably 4 to 7 GPa, and most preferably 4 to 6 GPa.

Incidentally, the term "elastic modulus" in this specification is the value measured in the following manner. A sample is moisture controlled under an environment of 25° C. 60% RH for 24 hours, and measured for its elastic modulus according to the method described in JIS K7127. The tensile tester used was Tensilon manufactured by A & D Co., Ltd.

Whereas, the thickness of the cellulose acylate film is preferably smaller for implementing a low-cost and thin liquid crystal display device. However, when it is too small, handling becomes difficult due to problems such as wrinkles upon bonding even if the elastic modulus is properly controlled as described above. Thus, it has been shown that setting of the film thickness at 20 to 70 µm prevents such problems from occurring. Therefore, setting of the film thickness at 20 to 70 µm can achieve the objects of the invention. The film thickness is preferably 30 to 60 µm, and most preferably 30 to 50 µm.

Further, the present inventors made a close study on a method for manufacturing a stretched film, and as a result, they found the following fact. It is possible to achieve the objects of the invention by stretching the film to 1.2 to 4.0 times and 1.05 to 3.8 times in biaxial directions orthogonal to each other, respectively. With such a biaxial stretching method, when the stretching ratio is set too high, rupture during stretching may occur. By setting the stretching ratio within the specific range, it is possible to implement the foregoing thin and high elastic modulus cellulose acylate film.

Whereas, the present inventors further pursued the study, and found the following fact. Use of cellulose acylate having a substituent by a propionyl group, a butyryl group, or a benzoyl group is more preferable for preventing the rupture as described above.

Further, when the stretching ratio becomes high for the formation of the foregoing thin film, the haze of the film tends to increase in the related art. An increase in haze reduces the resolution or the contrast of an image when the film is used for a liquid crystal display device. Therefore, minimum haze is desired.

Under such circumstances, the present inventors also focused attention on, and conducted a study on the temperature during stretching and the stretching velocity. As a result, they found the following fact. Biaxial stretching is carried out at a temperature of equal to or more than the glass transition temperature +25° C., and to be equal to or less than the crystallization temperature of the cellulose acylate film. Alternatively, biaxial stretching is carried out at a stretching velocity of 10%/min or less. As a result, it is possible to make the haze small even for a thin film manufactured with high ratio stretching.

Particularly, it can be said that the haze value of the cellulose acylate film is preferably smaller. However, the haze value is preferably 1% or less, and further preferably 0.7% or less. Incidentally, the haze value is the value obtained from the measurement by means of a haze meter MODEL 1001DP (manufactured by NIPPON DENSHOKU Co., Ltd.).

The expression "stretching ratio" in this specification will be additionally described. The wording "2.0-time stretching" represents the stretching such that the film is stretched to two times the length of the unstretched film. The wording is equal to the wording "100% stretching". Whereas, the term "10%/min" in terms of the stretching velocity is in equal relation to the expression "0.1 time/min". Specifically, the term "10%/min" represents the stretching velocity such that the film is stretched by a length of 0.1 time the length of the unstretched film per minute.

The invention has been completed based on the facts found by the present inventors. Specifically, the invention includes the following constitutions:

(1) A cellulose acylate film, which has a film thickness of from 20 to 70 µm and an elastic modulus of from 3.5 to 10 GPa in at least one direction of a film casting direction and a width direction.

(2) The cellulose acylate film as described in (1) above, which has an in-plane retardation Re within a range of from 20 to 80 nm and a retardation in a thickness-direction Rth within a range of from 100 to 250 nm.

(3) The cellulose acylate film as described in (1) or (2) above, which has a haze of 1% or less.

(4) The cellulose acylate film as described in any of (1) to (3) above, which substantially comprises a cellulose acylate satisfying expressions (I) and (II):

$$2.6 \leq A+B \leq 3.0; \text{ and} \quad \text{Expression (I)}$$

$$0 < B \quad \text{Expression (II):}$$

wherein A represents a substitution degree of a hydroxyl group in a glucose unit of the cellulose acylate by an acetyl group; and B represents a substitution degree of a hydroxyl group in a glucose unit of the cellulose acylate by a propionyl group, a butyryl group or a benzoyl group.

(5) A method for producing a cellulose acylate film, the method comprising:

subjecting a film to a stretching treatment, wherein the stretching treatment is carried out with a stretching ratio in a film casting direction within a range of from 1.2 to 4.0 and a stretching ratio in a width direction within a range of from 1.05 to 3.8, in which the film casting direction and the width direction are orthogonal to each other, and with a stretching treatment temperature of equal to or more than a glass transition temperature of the film +25° C. and equal to or less than a crystallization temperature of the film, and wherein a thickness of the film after being subjected to the stretching treatment is from 20 to 70 µm.

(6) A method for producing a cellulose acylate film, the method comprising:

subjecting a film to a stretching treatment, wherein the stretching treatment is carried out with a stretching ratio in a film casting direction within a range of from 1.2 to 4.0 and a stretching ratio in a width direction within a range of from 1.05 to 3.8, in which the film casting direction and the width direction are orthogonal to each other, and with a stretching velocity of 10%/minute or less in at least one direction of the film casting direction and the width direction, and wherein a thickness of the film after being subjected to the stretching treatment is from 20 to 70 μm.

(7) The cellulose acylate film as described in any of (1) to (4) above, which is obtained by a method as described in (5) or (6) above.

(8) A polarizing plate, which comprises:

a pair of protective films; and a polarizing film between the pair of protective films, wherein at least one of the pair of protective films is a cellulose acylate film as described in any of (1) to (4) and (7) above.

(9) A liquid crystal display device, which comprises a cellulose acylate film as described in any of (1) to (4) and (7) above or a polarizing plate as described in (8) above.

(10) An OCB or VA mode liquid crystal display device, which comprises:

a pair of polarizing plates; and a liquid crystal cell between the pair of polarizing plates, wherein at least one of the pair of polarizing plates is a polarizing plate as described in (8) above.

(11) A VA mode liquid crystal display device, which comprises:

a pair of polarizing plates; and a liquid crystal cell between the pair of polarizing plates, wherein the pair of polarizing plates comprises a polarizing plate as described in (8) above on a backlight side.

DETAILED DESCRIPTION OF THE INVENTION

Figure 1:
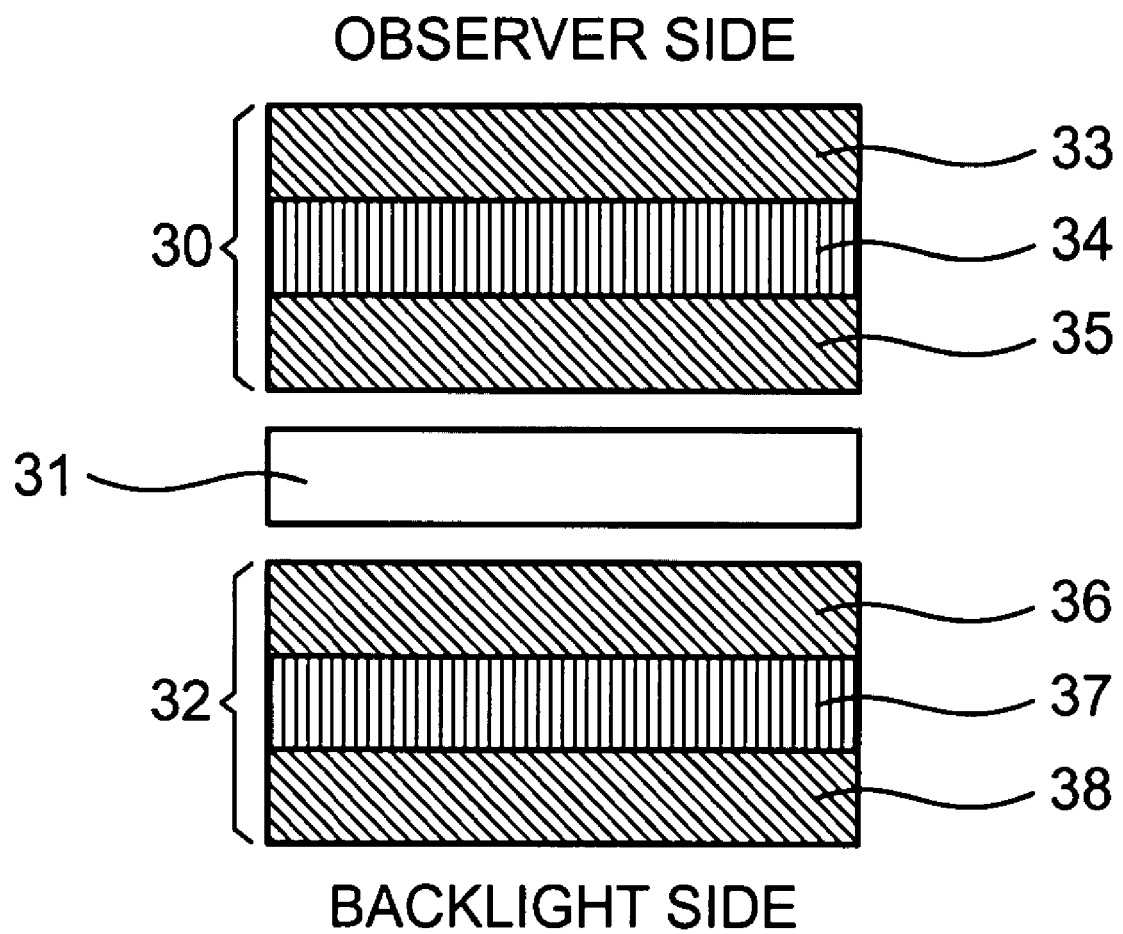
FIG. 1 is a cross sectional view for illustrating a liquid crystal display device manufactured in an exemplary example, Wherein 30 and 32 denote polarizing plates; 31 denotes liquid crystal cell; 34 and 37 denote polarizing films; 33 and 35 denote protective films; 36 denotes cellulose acylate film; and 38 denotes commercially available cellulose acylate film.

Below, the present invention will be described in more details.

The cellulose acylate film of the invention is characterized in that the film thickness falls within a specific range, and that the elastic modulus in at least one direction of the film casting direction and width direction falls within a specific range. "The casting direction" is a direction approximately parallel to a film transport direction during the production of the film. "The width direction" is a direction approximately orthogonal to the casting direction.

Below, the raw materials for the cellulose acylate film of the invention, a manufacturing method thereof, and the film itself will be described in details in this order.

<Raw Materials for Cellulose Acylate Film>

[Cellulose Acylate]

First, cellulose acylate for use in the invention will be described in details. In the invention, different two or more cellulose acylates may be mixed and used.

As the cellulose acylate, there can be preferably used cellulose acylate satisfying the expressions (I) and (II):

$$2.6 \leq A+B \leq 3.0; \text{ and} \qquad \text{Expression (I)}$$

$$0 < B \qquad \text{Expression (II)}$$

where A represents the substitution degree by an acetyl group of a hydroxyl group in a glucose unit of cellulose acylate, and B represents the substitution degree by a propionyl group, a butyryl group, or a benzoyl group.

The β-1,4 bonded glucose units forming cellulose each have free hydroxyl groups at 2, 3, and 6 positions. Cellulose acylate is a polymer obtained by partially or fully esterifying these hydroxyl groups with acyl groups. The acyl substitution degree represents the proportion of esterification of cellulose (100% esterification corresponds to a substitution degree of 1 at each position) for each of the 2, 3, and 6 positions. The acyl substitution degree can be measured according to ASTM-D817-96.

In the invention, the total sum (A+B) of the substitution degrees A and B of hydroxyl groups is preferably 2.6 to 3.0 as shown in the expression (I). Whereas, the substitution degree of B is preferably more than 0, more preferably 0.5 or more and 1.2 or less, and further preferably 0.6 or more and 0.8 or less as shown in the expression (II).

When A+B is less than 2.6, the hydrophilicity becomes too strong, and thereby the compound becomes more likely to be affected by the environmental humidity. Therefore, A+B preferably falls within the foregoing range. Whereas, when B is more than 0, i.e., by using cellulose acylate having a substituent by a propionyl group, a butyryl group, or a benzoyl group, as described above, the rupture of the film can be prevented. This case is preferable. Cellulose acylate may have one or more substituents in the substitution degree B, i.e., a propionyl group, a butyryl group, or a benzoyl group.

{Synthesis Method of Cellulose Acylate}

The basic principal of the synthesis method of cellulose acylate is described in MOKUZAI KAGAKU, by MIGITA et al., p.p., 180 to 190, (Kyoritsu Publishing Co., 1968). The typical synthesis method is a liquid phase acetylation process with carboxylic acid anhydride—acetic acid—sulfuric acid catalyst.

In order to obtain the cellulose acylate, specifically, the following procedure is carried out. A cellulose raw material such as cotton linter or wood pulp is pretreated with a proper amount of acetic acid, and then charged into a previously cooled carboxylated mixed solution for esterification. Thus, perfect cellulose acylate (the total sum of acyl substitution degrees at the 2, 3, and 6 positions, almost 3.00) is synthesized. The carboxylated mixed solution generally contains acetic acid as a solvent, carboxylic acid anhydride (e.g., acetic acid anhydride and propionic acid anhydride, or butyric acid anhydride) as an esterifying agent, and sulfuric acid as a catalyst. Carboxylic acid anhydride is commonly used in a stoichiometrically excessive amount based on the total amount of cellulose to react therewith, and the moisture present in the system. After the completion of the esterification reaction, an aqueous solution of neutralizing agent (e.g., carbonate, acetate, or oxide of calcium, magnesium, iron, aluminum, or zinc) is added in order to hydrolyze an excess of carboxylic acid anhydride and neutralize a part of the esterifying catalyst remaining in the system. Then, the resulting perfect cellulose acylate is held at 50 to 90° C. in the presence of a small amount of an acetylation reaction catalyst (generally, remaining sulfuric acid) for saponification and aging. Thus, the compound is changed to cellulose acylate having desirable acyl substitution degree and polymerization degree. At the instant when the desirable cellulose acylate is obtained, the catalyst remaining in the system is fully neutralized using the catalyst as described above, or without neutralization, a cellulose acylate solution is charged in water or dilute sulfuric acid (alternatively, water or dilute sulfuric acid is charted into a cellulose acylate solution). As a result, cellulose acylate is separated, washed, and subjected to a stabilizing treatment, or other treatments. Thus, the specific cellulose acylate can be obtained.

For the cellulose acylate film, the polymer components forming the film preferably substantially include the cellulose acylate satisfying the expressions (I) and (II). The term "substantially" means 55 mass % or more (preferably 70 mass % or more, and further preferably 80 mass % or more) of the polymer components. (In this specification, mass ratio is equal to weight ratio.)

The cellulose acylate is also preferably used in the form of particles. 90 mass % or more of the particles used preferably have a particle diameter of 0.5 to 5 mm. Further, 50 mass % or more of the particles used preferably have a particle diameter of 1 to 4 mm. The cellulose acylate particles each preferably are as spherical as possible.

The polymerization degree of cellulose acylate to be preferably used in the invention is, in terms of viscosity average polymerization degree, preferably 200 to 700, more preferably 250 to 550, further preferably 250 to 400, and in particular preferably 250 to 350. The average polymerization degree can be measured with the limiting viscosity method by Uda et al., (Uda Kazuo, and Saito Hideo, SENNI GAKKAISHI, vol. 18, No. 1, pages 105 to 120, 1962). It is further described in details in JP-A-9-95538.

When low molecular weight components are removed, the average molecular weight (polymerization degree) increases, but the viscosity becomes lower than that of general cellulose acylate. For this reason, as the cellulose acylate, the one from which the low molecular weight components have been removed is useful. Cellulose acylate low in content of low molecular weight components can be obtained by removing the low molecular weight components from cellulose acylate synthesized with a general method. Removal of the low molecular weight components can be carried out by washing cellulose acylate with a proper organic solvent. Incidentally, when cellulose acylate low in content of low molecular weight components is produced, the amount of sulfuric acid catalyst in the acetylation reaction is preferably adjusted to 0.5 to 25 parts by mass per 100 parts by mass of cellulose acylate. When the amount of the sulfuric acid catalyst is set within the range, it is possible to synthesize cellulose acylate preferable also in terms of molecular weight distribution (uniform in molecular weight distribution). For use in the production of cellulose acylate, the moisture content is preferably 2 mass % or less, further preferably 1 mass % or less, and in particular 0.7 mass % or less. It is generally known that cellulose acylate contains water, and has a moisture content of 2.5 to 5 mass %. In the invention, in order to achieve the moisture content of cellulose acylate, drying is necessary. The method thereof has no particular restriction so long as it provides an objective moisture content.

As the raw material cotton and the synthesis method of the cellulose acylate, there can be adopted the raw material cotton and the synthesis method described in details on p. 7 to 12 in Journal of Technical Disclosure (KOUKAI GIHOU) from Japan Institute of Invention and Innovation, Technical Disclosure No. 2001-1745, (published on Mar. 15, 2001, Institute of Invention and Innovation).

The cellulose acylate film of the invention can be obtained by using a solution prepared by dissolving the specific cellulose acylate, and if required, additives in an organic solvent, for film formation.

{Additives}

In the invention, examples of the additives usable for the cellulose acylate solution may include a plasticizer, an ultraviolet absorber, a deterioration inhibitor, a retardation (optical anisotropy) developer, fine particles, a release accelerator, and an infrared absorber. In the invention, a retardation developer may be used. Further, at least one or more of a plasticizer, an ultraviolet absorber, and a release accelerator is also preferably used.

They may be each either a solid or an oily substance. Namely, it has no particular restriction on the melting point or the boiling point. For example, ultraviolet absorbers of 20° C. or less and 20° C. or more may be mixed to be used. Similarly, a plasticizer may be mixed therein to be used. For example, they are described in JP-A-2001-151901, or the like.

As the ultraviolet absorber, a given type one can be selected according to the intended purpose. A salicylic acid ester type, benzophenone type, benzotriazole type, benzoate type, cyano acrylate type, nickel complex salt type, or other type absorber may be used. Preferred are benzophenone type, benzotriazole type, and salicylic acid ester type.

Examples of the benzophenone type ultraviolet absorber may include 2,4-dihydroxybenzophenone, 2-hydroxy-4-acetoxybenzophenone, 2-hydroxy-4-methoxybenzophenone, 2,2'-di-hydroxy-4-methoxybenzophenone, 2,2'-di-hydroxy-4,4'-methoxybenzophenone, 2-hydroxy-4-n-oxtoxybenzopheone, 2-hydroxy-4-dodecyloxybenzophenone, and 2-hydroxy-4-(2-hydroxy-3-methacryloxy)propoxy benzophenone.

As the benzotriazole type ultraviolet absorber, mention may be made of 2(2'-hydroxy-3'-tert-butyl-5'-methylphenyl)-5-chlorobenzotriazole, 2(2'-hydroxy-5'-tert-butylphenyl) benzotriazole, 2(2'-hydroxy-3'5'-di-tert-amylphenyl)benzotriazole, 2(2'-hydroxy-3'5'-di-tert-butylphenyl)-5-chlorobenzotriazole, 2(2'-hydroxy-5'-tert-octylphenyl) benzotriazole, or the like.

As salicylic acid ester type, mention may be made of phenyl salicylate, p-octylphenyl salicylate, p-tert-butylphenyl salicylate, or the like. Out of these exemplified ultraviolet absorbers, particularly, 2-hydroxy-4-methoxybenzophenone, 2,2'-di-hydroxy-4,4'-methoxybenzophenone, 2(2'-hydroxy-3'-tert-butyl-5'-methylphenyl)-5-chlorobenzotriazole, 2(2'-hydroxy-5'-tert-butylphenyl)benzotriazole, 2(2'-hydroxy-3'5'-di-tert-amylphenyl)benzotriazole, and 2(2'-hydroxy-3'5'-di-tert-butylphenyl)-5-chlorobenzotriazole are in particular preferred.

As for the ultraviolet absorbers, a plurality of absorbers having different absorption wavelengths are preferably used in a composite manner because they can provide a high cutting effect within a wide wavelength range. Preferably, the ultraviolet absorbers for liquid crystal are excellent in absorbing power for an ultraviolet ray with a wavelength of 370 nm or less from the viewpoint of preventing the degradation of the liquid crystal, and less absorb visible light with a wavelength of 400 nm or more from the viewpoint of the liquid crystal display performance. Particularly preferred ultraviolet absorbers are the previously mentioned benzotriazole type compounds, benzophenone type compounds, and salicylic acid ester type compounds. Out of these, the benzotriazole type compounds are preferred because they cause less unnecessary coloration of cellulose esters.

Further, for the ultraviolet absorbers, there can also be used the compounds described in respective publications of JP-A-60-235852, JP-A-3-199201, JP-A-5-1907073, JP-A-5-194789, JP-A-5-271471, JP-A-6-107854, JP-A-6-118233, JP-A-6-148430, JP-A-7-11056, JP-A-7-11055, JP-A-7-11056, JP-A-8-29619, JP-A-8-239509, and JP-A-2000-204173.

The amount of the ultraviolet absorber to be added is preferably 0.001 to 5 parts by mass, and more preferably 0.01 to 1 parts by mass per 100 parts by mass of cellulose acylate. When the amount is 0.001 parts by mass or more, the addition effect can be sufficiently exerted. Whereas, when the amount is 5 parts by mass or less, bleed-out of the ultraviolet absorber onto the film surface does not occur. Thus, such an amount is preferred.

Whereas, the ultraviolet absorber may be added simultaneously with dissolution of cellulose acylate, or may be added to the dope after dissolution. Particularly, the process in which an ultraviolet absorber solution is added to a dope immediately before casting by means of a static mixer is preferable because the process can adjust the spectral absorption characteristics with ease.

The deterioration inhibitor can prevent the degradation or decomposition of cellulose triacetate or the like. The deterioration inhibitors include compounds such as butylamine, a hindered amine compound (JP-A-8-325537), a guanidine compound (JP-A-5-271471), benzotriazole type UV absorbers (JP-A-6-235819), and benzophenone type UV absorbers (JP-A-6-118233).

The plasticizer is preferably a phosphoric acid ester, or a carboxylic acid ester. Further, the plasticizer is more preferably selected from triphenyl phosphate (TPP), tricresyl phosphate (TCP), cresyl diphenyl phosphate, octyl diphenyl phosphate, diphenyl biphenyl phosphate, trioctyl phosphate, tributyl phosphate, dimethyl phthalate (DMP), diethyl phthalate (DEP), dibutyl phthalate (DBP), dioctyl phthalate (DOP), diphenyl phthalate (DPP), diethylhexyl phthalate (DEHP), triethyl o-acetyl citrate (OACTE), tributyl o-acetyl citrate (OACTB), acetyl triethyl citrate, acetyl tributyl citrate, butyl oleate, methyl acetyl ricinolate, dibutyl sebacate, triacetin, tributyrin, butyl phthalylbutyl glycolate, ethyl phthalylethyl glycolate, methyl phthalylethyl glycolate, and butyl phthalylbutyl glycolate. Further, the plasticizers are preferably (di) pentaerythritol esters, glycerol esters, and diglycerol esters.

Examples of the release accelerator may include ethyl esters of citric acid. Still further, the infrared absorbers are described in, for example, JP-A-2001-194522.

These additives may be added at any timing in the dope production process. However, a step of adding the additives for preparation may be added to the final preparation step in the dope production process for carrying out the addition. Still further, the amount of each material to be added has no particular restriction so long as it allows the function to be exerted. Whereas, when the cellulose acylate film is in a multilayered structure, the types and the amounts of additives for respective layers may be different. Although these are described in, for example, JP-A-2001-151902, these are conventionally known techniques. Preferably, by selecting the types and the amount of the additives, the glass transition point Tg measured by means of a dynamic viscoelasticity meter (VIBRON: DVA-225 (ITK Co., Ltd., Japan)) is set at 70 to 150° C. More preferably, the glass transition point Tg is 80 to 135° C. Namely, the cellulose acylate film of the invention is preferably set to have a glass transition point Tg within the foregoing ranges in terms of the process suitability in processing into a polarizing plate and mounting of a liquid crystal display device.

Further, for the additives, there can be appropriately used the ones described in details on p. 16 and later pages in Journal of Technical Disclosure (KOUKAI GIHOU) from Japan Institute of Invention and Innovation, Technical Disclosure No. 2001-1745, (published on Mar. 15, 2001, Institute of Invention and Innovation).

These additives can be added in such an amount as not to impair the desirable effects of the invention.

{Retardation Developer}

In the invention, a retardation developer may be used in order for a preferred retardation value to be revealed.

As the retardation developer usable in the invention, mention may be made of the one including a rod-like or discotic compound.

As the rod-like or discotic compound, a compound having at least two aromatic rings can be used.

The amount of the retardation developer including a rod-like compound to be added is preferably 0.1 to 30 parts by mass, and further preferably 0.5 to 20 parts by mass per 100 parts by mass of a polymer component containing cellulose acylate.

The discotic retardation developer is preferably used in the range of 0.05 to 20 parts by mass, more preferably used in the range of 0.1 to 10 parts by mass, further preferably used in the range of 0.2 to 5 parts by mass, and most preferably used in the range of 0.5 to 2 parts by mass per 100 parts by mass of the polymer component containing the cellulose acylate.

The discotic compound is superior in Rth revealability to the rod-like compound, and hence it is preferably used when a particularly large Rth is necessary.

Two or more retardation developers may be used in combination.

The retardation developer including a rod-like or discotic compound preferably has a maximum absorption in the wavelength region of 250 to 400 nm, and preferably substantially does not have an absorption within the visible region.

The discotic compound will be described. As the discotic compound, a compound having at least two aromatic rings can be used.

In this specification, the "aromatic rings" include an aromatic heterocyclic ring in addition to an aromatic hydrocarbon ring.

The aromatic hydrocarbon ring is in particular preferably a 6-membered ring (i.e., a benzene ring).

The aromatic heterocyclic ring is generally an unsaturated heterocyclic ring. The aromatic heterocyclic ring is preferably a 5-membered ring, a 6-membered ring, or a 7-membered ring, and further preferably a 5-membered ring or a 6-membered ring. The aromatic heterocyclic ring generally has a largest number of double bonds. The hetero atom is preferably a nitrogen atom, an oxygen atom, or a sulfur atom, and in particular preferably a nitrogen atom. Examples of the aromatic heterocyclic ring may include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyran ring, a pyridine ring, a pyridazine ring, a pyrimidine ring, a pyrazine ring, and a 1,3,5-triazine ring.

The aromatic ring is preferably a benzene ring, a furan ring, a thiophene ring, a pyrrole ring, an oxazole ring, a thiazole ring, an imidazole ring, a triazole ring, a pyridine ring, a pyrimidine ring, a pyrazine ring, and a 1,3,5-triazine ring.

Particularly, a 1,3,5-triazine ring is preferably used. Specifically, for example, the compounds disclosed in JP-A-2001-166144 are preferably used as discotic compounds.

The number of aromatic rings possessed by the discotic compound is preferably 2 to 20, more preferably 2 to 12, further preferably 2 to 8, and most preferably 2 to 6.

The connecting relations between two aromatic rings can be classified into: (a) the case where a condensed ring is formed; (b) the case where the rings are directly connected to each other through a single bond; and (c) the case where the rings are connected to each other through a linking group (the spiro connection cannot be formed due to aromatic ring). The connecting relation may be any of (a) to (c).

Preferred examples of the condensed ring (condensed ring of two or more aromatic rings) of the item (a) may include an indene ring, a naphthalene ring, an azulene ring, a fluorene ring, a phenanthrene ring, an anthracene ring, an acenaphthylene ring, a biphenylene ring, a naphthacene ring, a pyrene ring, an indole ring, an isoindole ring, a benzofuran ring, a benzothiophene ring, an indolizine ring, a benzoxazole ring, a benzothiazole ring, a benzimidazole ring, a benzotriazole ring, a purine ring, an indazole ring, a chromene ring, a quinoline ring, an isoquinoline ring, a quinolizine ring, a quinazoline ring, a cinnoline ring, a quinoxaline ring, a phthalazine ring, a pteridine ring, a carbazole ring, an acridine ring, a phenantridine ring, a xanthene ring, a phenazine ring, a phenothiazine ring, a phenoxathiin ring, a phenoxazine ring, and a thianthrene ring. A naphthalene ring, an azulene ring, an indole ring, a benzoxazole ring, a benzothiazole ring, a benzimidazole ring, a benzotriazole ring, and a quinoline ring are preferred.

The single bond of the item (b) is preferably a bond between the carbon atoms of two aromatic rings. It is also acceptable that the two aromatic rings are linked through two or more single bonds, and that an aliphatic ring or a nonaromatic heterocyclic ring is formed between the two aromatic rings.

The linking group of the item (c) is preferably linked to the carbon atoms of two aromatic rings. The linking group is preferably an alkylene group, an alkenylene group, an alkynylene group, —CO—, —O—, —NH—, or —S—, or a combination thereof. Examples of the linking group made of the combination will be shown below. Incidentally, the relation between the left-hand side and the right-hand side of each example of the following linking groups may be reversed.

c1:—CO—O—
c2:—CO—NH—
c3:-alkylene-O—
c4:—NH—CO—NH—
c5:—NH—CO—O—
c6:—O—CO—O—
c7:—O-alkylene-O—
c8:-CO-alkenylene-
c9:-CO-alkenylene-NH—
c10:-CO-alkenylene-O—
c11:-alkylene-CO—O-alkylene-O—CO-alkylene-
c12:—O-alkylene-CO—O-alkylene-O—CO-alkylene-O—
c13:—O—CO-alkylene-CO—O—
c14:—NH—CO-alkenylene-
c15:—O—CO-alkenylene- The aromatic ring and the linking group may each have a substituent.

Examples of the substituent may include halogen atoms (F, Cl, Br, I), a hydroxyl group, a carboxyl group, a cyano group, an amino group, a nitro group, a sulfo group, a carbamoyl group, a sulfamoyl group; an ureido group, an alkyl group, an alkenyl group, an alkynyl group, an aliphatic acyl group, an aliphatic acyloxy group, an alkoxy group, an alkoxy carbonyl group, an alkoxy carbonyl amino group, an alkylthio group, an alkyl sulfonyl group, an aliphatic amido group, an aliphatic sulfonamido group, an aliphatic substituted amino group, an aliphatic substituted carbamoyl group, an aliphatic substituted sulfamoyl group, an aliphatic substituted ureido group, and a nonaromatic heterocyclic group.

The number of carbon atoms of an alkyl group is preferably 1 to 8. A chain alkyl group is more preferred than a cyclic alkyl group, and a straight-chain alkyl group is in particular preferred. An alkyl group may further have a substituent (e.g., a hydroxy group, a carboxy group, an alkoxy group, an alkyl substituted amino group). Examples of the alkyl group (including a substituted alkyl group) may include a methyl group, an ethyl group, a n-butyl group, a n-hexyl group, a 2-hydroxyethyl group, a 4-carboxybutyl group, a 2-methoxyethyl group, and a 2-diethylaminoethyl group.

The number of carbon atoms of an alkenyl group is preferably 2 to 8. A chain alkenyl group is more preferable than a cyclic alkenyl group, and a straight-chain alkenyl group is in particular preferred. An alkenyl group may further have a substituent. Examples of an alkenyl group may include a vinyl group, an allyl group and a 1-hexenyl group.

The number of carbon atoms of an alkynyl group is preferably 2 to 8. A chain alkynyl group is more preferable than a cyclic alkynyl group, and a straight-chain alkynyl group is in particular preferred. An alkynyl group may further have a substituent. Examples of an alkynyl group may include an ethynyl group, a 1-butynyl group, and a 1-hexynyl group.

The number of carbon atoms of an aliphatic acyl group is preferably 1 to 10. Examples of the aliphatic acyl group may include an acetyl group, a propanoyl group, and a butanoyl group.

The number of carbon atoms of an aliphatic acyloxy group is preferably 1 to 10. Examples of an aliphatic acyloxy group may include an acetoxy group.

The number of carbon atoms of an alkoxy group is preferably 1 to 8. An alkoxy group may further have a substituent (e.g., an alkoxy group). Examples of an alkoxy group (including a substituted alkoxy group) may include a methoxy group, an ethoxy group, a butoxy group, and a methoxyethoxy group.

The number of carbon atoms of an alkoxy carbonyl group is preferably 2 to 10. Examples of an alkoxy carbonyl group may include a methoxy carbonyl group and an ethoxy carbonyl group.

The number of carbon atoms of an alkoxy carbonyl amino group is preferably 2 to 10. Examples of an alkoxy carbonylamino group may include a methoxy carbonyl amino group and an ethoxy carbonyl amino group.

The number of carbon atoms of an alkylthio group is preferably 1 to 12. Examples of an alkylthio group may include a methylthio group, an ethylthio group, and an octylthio group.

The number of carbon atoms of an alkyl sulfonyl group is preferably 1 to 8. Examples of an alkyl sulfonyl group may include a methane sulfonyl group and an ethane sulfonyl group.

The number of carbon atoms of an aliphatic amido group is preferably 1 to 10. Examples of an aliphatic amido group may include an acetamido group.

The number of carbon atoms of an aliphatic sulfonamido group is preferably 1 to 8. Examples of an aliphatic sulfonamido group may include a methane sulfonamido group, a butane sulfonamido group, and a n-octane sulfonamido group.

The number of carbon atoms of an aliphatic substituted amino group is preferably 1 to 10. Examples of an aliphatic substituted amino group may include a dimethylamino group, a diethylamino group, and a 2-carboxy ethylamino group.

The number of carbon atoms of an aliphatic substituted carbamoyl group is preferably 2 to 10. Examples of an aliphatic substituted carbamoyl group may include a methyl carbamoyl group and a diethyl carbamoyl group.

The number of carbon atoms of an aliphatic substituted sulfamoyl group is preferably 1 to 8. Examples of an aliphatic substituted sulfamoyl group may include a methyl sulfamoyl group and a diethyl sulfamoyl group.

The number of carbon atoms of an aliphatic substituted ureido group is preferably 2 to 10. Examples of an aliphatic substituted ureido group may include a methylureido group, Examples of a nonaromatic heterocyclic group may include a piperidino group and a morpholino group.

The molecular weight of a retardation developer including a discotic compound is preferably 300 to 800.

In the invention, other than the discotic compound, a rod-like compound having a linear molecular structure can also be preferably used. The linear molecular structure denotes the molecular structure of a rod-like compound being linear in the thermodynamically most stable structure. The thermodynamically most stable structure can be determined by the crystal structure analysis or the molecular orbital calculation. For example, by the use of molecular orbital calculation software {e.g., Win MOPAC 2000, manufactured by FUJITSU Limited}, the molecular orbital calculation is carried out. This can determine the molecular structure such that the heat of formation of the compound is minimized. The wording "the molecular structure being linear" denotes that, in the thermodynamically most stable structure determined from the foregoing calculation, the angle formed by the main chains in the molecular structure is 140 degrees or more.

As specific examples of these discotic compounds and rod-like compounds, the compounds mentioned in JP-A-2004-243628 and JP-A-2005-134863 can be used alone, or in combination of a plurality thereof.

The rod-like compounds having a maximum absorption wavelength ($\lambda$max) on the shorter wavelength side of 250 nm in the ultraviolet absorption spectrum of the solution may be used in combination of two or more thereof.

The rod-like compound can be synthesized with the methods described in documents. As the documents, mention may be made of Mol. Cryst. Liq. Cryst., vol. 53, page 229, (1979), the same document, vol. 89, page 93 (1982), the same document, vol. 145, page 111, (1987), the same document, vol. 70, page 43,.(1989), J. Am. Chem. Soc., vol. 113, page 1349, (1991), the same document, vol. 118, page 5346, (1996), the same document, vol. 92, page 1582, (1970), J. Org. Chem., vol. 40, page 420, (1975), and Tetrahedron, vol. 48, No. 16, page 3437, (1992), {Mat Agent Fine Particles}

The cellulose acylate film of the invention preferably includes, as an additive, fine particles added therein as a mat agent. As the fine particles for use in the invention, mention may be made of those of silicon dioxide, titanium dioxide, aluminum oxide, zirconium oxide, calcium carbonate, talc, clay, sintered kaolin, sintered calcium silicate, hydrated calcium silicate, aluminum silicate, magnesium silicate, and calcium phosphate. As the fine particle, the one containing silicon is preferred because of its low turbidity, and particularly silicon dioxide is preferred. The fine particles of silicon dioxide preferably have a primary average particle diameter of 20 nm or less, and an apparent specific gravity of 70 g/l or more. The ones having an average diameter of primary particles of as small as 5 to 16 nm are more preferred because they can reduce the haze of the film. The apparent specific gravity is preferably 90 to 200 g/l or more, and further preferably 100 to 200 g/l or more. The ones with a larger apparent specific gravity is preferred because they can form a high-concentration dispersion, resulting in improvements of the haze and the aggregate.

When the silicon dioxide fine particles are used, they are preferably used in an amount of 0.01 to 0.3 part by mass per 100 parts by mass of the polymer component containing cellulose acylate.

These fine particles generally form secondary particles with an average particle diameter of 0.1 to 3.0 μm. These fine particles are present in the form of aggregates of primary particles in the film, and form 0.1- to 3.0-μm unevenness on the film surface. The secondary average particle diameter is preferably 0.2 μm or more and 1.5 μm or less, further preferably 0.4 μm or more and 1.2 μm or less, and most preferably 0.6 μm or more and 1.1 μm or less. When it is larger than 1.5 μm, the haze becomes stronger. Whereas, when it is smaller than 0.2 μm, the strain preventive effect becomes small.

The primary or secondary particle diameter is defined as follows. The particles in the film are observed by a scanning type electron microscope, and the diameter of the circle circumscribing the particle is taken as the particle diameter. Whereas, in another site, 200 particles are observed. The average value thereof is taken as the average particle diameter.

As the fine particles of silicon dioxide, there can be used commercially available products such as AEROSIL R972, R972V, R974, R812, 200, 200V, 300, R202, OX50, and TT600 (all manufactured by NIPPON AEROSIL Co., Ltd.). The fine particles of zirconium oxide are commercially available under the trade names of AEROSIL R976 and R811 (all manufactured by NIPPON AEROSIL Co., Ltd.), and usable.

Out of these, AEROSIL 200V and AEROSIL R972V are fine particles of silicon dioxide having a primary average particle diameter of 20 nm or less, and an apparent specific gravity of 70 g/l or more, and these are in particular preferable because these have a large effect of reducing the coefficient of friction while keeping the turbidity of the optical film.

In the invention, in order to obtain a cellulose acylate film having particles with a small secondary average particle diameter, some techniques are conceivable for preparing dispersions of fine particles. For example, there is the following method: a fine particle dispersion obtained by stirring and mixing a solvent and fine particles is previously formed; the fine particle dispersion is added to a small amount of a cellulose acylate solution separately prepared, and dissolved therein with stirring; and the resulting solution is further mixed with a main cellulose acylate dope solution. This method is a preferable preparation method in that the dispersibility of silicon dioxide fine particles is good, and that silicon dioxide fine particles are less likely to further aggregate again. Other than this, there is another method as follows: a small amount of cellulose ester is added to a solvent, and dissolved therein with stirring; then, fine particles are added thereto, and dispersed therein by means of a dispersing machine, so that the resulting dispersion is a fine particle-added solution; then, the fine particle-added solution is sufficiently mixed with a dope solution by means of an inline mixer. The invention is not limited to these methods. However, the concentration of silicon dioxide when silicon dioxide fine particles are mixed with a solvent or the like, and dispersed therein is preferably 5 to 30 mass %, further preferably 10 to 25 mass %, and most preferably 15 to 20 mass %. A higher dispersion concentration is preferred because the solution turbidity becomes lower relative to the amount added , resulting in improvements of the haze and the aggregate. The amount of the mat agent to be added in the final cellulose acylate dope solution is preferably 0.01 to 1.0 g, further preferably 0.03 to 0.3 g, and most preferably 0.08 to 0.16 g per square meters.

As for the solvents to be used, as lower alcohols, mention may be preferably made of methanol, ethanol, propanol, isopropanol, butanol, and the like. Other solvents than lower alcohols have no particular restriction. However, the solvents to be used for the deposition of the cellulose acylate film are preferably used.

{Organic Solvent}

Then, the organic solvents in which the cellulose acylate is dissolved for manufacturing the cellulose acylate film of the invention will be described.

In the invention, as organic solvents, both of chlorine type solvents each containing a chlorine type organic solvent as a main solvent, and non-chlorine type solvents each not containing a chlorine type organic solvent can be used.

(Chlorine Type Solvent)

For producing the cellulose acylate solution of the invention, a chlorine type organic solvent is preferably used as the main solvent. In the invention, the type of the chlorine type organic solvent has no particular restriction so long as the objects can be attained in such a range that cellulose acylate can be dissolved and cast to be formed in a film. These chlorine type organic solvents are preferably dichloromethane and chloroform. Particularly, dichloromethane is preferred. Whereas, mixing of other organic solvents than chlorine type organic solvents also presents no problem. In such a case, dichloromethane is required to be used in an amount of at least 50 mass % based on the total amount of the organic solvents. Other solvents to be used in combination with chlorine type organic solvents in the invention will be described below. Namely, as preferred other organic solvents, the solvents selected from esters, ketones, ethers, alcohols, and hydrocarbons, having 3 to 12 carbon atoms are preferred. Esters, ketones, ethers, and alcohols may each have a cyclic structure. A compound having two or more of any of the functional groups (i.e., —O—, —CO—, and —COO—) of esters, ketones, and ethers can also be used as a solvent. For example, it may have another functional group such as an alcoholic hydroxyl group at the same time. For the solvent having two or more functional groups, the number of carbon atoms thereof may fall within the specific range of the compound having any functional group. Examples of esters each having 3 to 12 carbon atoms may include ethyl formate, propyl formate, pentyl formate, methyl acetate, ethyl acetate, and pentyl acetate. Examples of ketones each having 3 to 12 carbon atoms may include acetone, methyl ethyl ketone, diethyl ketone, diisobutyl ketone, cyclopentanone, cyclohexanone, and methyl cyclohexanone. Examples of ethers having 3 to 12 carbon atoms may include diisopropyl ether, dimethoxymethane, dimethoxyethane, 1,4-dioxane, 1,3-dioxolane, tetrahydrofuran, anisole, and phenetole. Examples of the organic solvent having two or more functional groups may include 2-ethoxy ethyl acetate, 2-methoxy ethanol, and 2-butoxy ethanol.

Whereas, alcohols to be used in combination with chlorine type organic solvents may be preferably straight-chain, branched, or cyclic. Out of these, saturated aliphatic hydrocarbons are preferred. Alcohols may have any of primary to tertiary hydroxyl groups. Examples of alcohol may include methanol, ethanol, 1-propanol, 2-propanol, 1-butanol, 2-butanol, t-butanol, 1-pentanol, 2-methyl-2-butanol, and cyclohexanol. Incidentally, as alcohols, fluorine type alcohols are also used. Examples thereof may include 2-fluoroethanol, 2,2,2-trifluoroethanol, and 2,2,3,3-tetrafluoro-1-propanol. Further, hydrocarbons may be straight-chain, branched, or cyclic. Either of aromatic hydrocarbons and aliphatic hydrocarbons may be used. The aliphatic hydrocarbons may be saturated or unsaturated. Examples of hydrocarbons may include cyclohexane, hexane, benzene, toluene, and xylene.

Non-limiting examples of the combinations of chlorine type organic solvents and other organic solvents may include the following compositions:

Dichloromethane/methanol/ethanol/butanol (80/10/5/5, parts by mass),
Dichloromethane/acetone/methanol/propanol (80/10/5/5, parts by mass),
Dichloromethane/methanol/butanol/cyclohexane (80/10/5/5, parts by mass),
Dichloromethane/methyl ethyl ketone/methanol/butanol (80/10/5/5, parts by mass),
Dichloromethane/acetone/methyl ethyl ketone/ethanol/isopropanol (75/8/5/5/7, parts by mass),
Dichloromethane/cyclopentanone/methanol/isopropanol (80/7/5/8, parts by mass),
Dichloromethane/methyl acetate/butanol (80/10/10, parts by mass),
Dichloromethane/cyclohexanone/methanol/hexane (70/20/5/5, parts by mass),
Dichloromethane/methyl ethyl ketone/acetone/methanol/ethanol (50/20/20/5/5, parts by mass),
Dichloromethane/1,3-dioxolane/methanol/ethanol (70/20/5/5, parts by mass),
Dichloromethane/dioxane/acetone/methanol/ethanol (60/20/10/5/5, parts by mass),
Dichloromethane/acetone/cyclopentanone/ethanol/isobutanol/cyclohexane (65/10/10/5/5/5, parts by mass),
Dichloromethane/methyl ethyl ketone/acetone/methanol/ethanol (70/10/10/5/5, parts by mass),
Dichloromethane/acetone/ethyl acetate/ethanol/butanol/hexane (65/10/10/5/5/5, parts by mass),
Dichloromethane/methyl acetoacetate/methanol/ethanol (65/20/10/5, parts by mass), and
Dichloromethane/cyclopentanone/ethanol/butanol (65/20/10/5, parts by mass).

(Non-Chlorine Type Solvent)

Then, a description will be given to non-chlorine type organic solvents to be preferably used in producing the cellulose acylate solution of the invention. In the invention, the non-chlorine type organic solvent has no particular restriction so long as the objects can be attained in such a range that cellulose acylate can be dissolved and cast to be formed in a film. The non-chlorine type organic solvents for use in the invention are preferably the solvents selected from esters, ketones, and ethers, having 3 to 12 carbon atoms are preferred. Esters, ketones, and ethers may each have a cyclic structure. A compound having two or more of any of the functional groups (i.e., —O—, —CO—, and —COO—) of esters, ketones, and ethers can also be used as a main solvent. For example, it may have another functional group such as an alcoholic hydroxyl group. For the main solvent having two or more functional groups, the number of carbon atoms thereof may fall within the prescribed range of the compound having any functional group. Examples of esters each having 3 to 12 carbon atoms may include ethyl formate, propyl formate, pentyl formate, methyl acetate, ethyl acetate, and pentyl acetate. Examples of ketones each having 3 to 12 carbon atoms may include acetone, methyl ethyl ketone, diethyl ketone, diisobutyl ketone, cyclopentanone, cyclohexanone, and methyl cyclohexanone. Examples of ethers having 3 to 12 carbon atoms may include diisopropyl ether, dimethoxy methane, dimethoxy ethane, 1,4-dioxane, 1,3-dioxolane, tetrahydrofuran, anisole, and phenetole. Examples of the organic solvent having two or more functional groups may include 2-ethoxy ethyl acetate, 2-methoxy ethanol, and 2-butoxy ethanol.

The non-chlorine type organic solvents for use in cellulose acylate described up to this point are selected from the various viewpoints described above. However, they are preferably as follows. Namely, a non-chlorine type organic solvent is preferably a mixed solvent containing the non-chlorine type organic solvent as a main solvent. It is a mixed solvent of mutually different three or more solvents, wherein the first solvent is at least one selected from methyl acetate, ethyl acetate, methyl formate, ethyl formate, acetone, dioxolane, and dioxane, or a mixed solution thereof; the second solvent is selected from ketones or acetoacetic acid esters having 4 to 7 carbon atoms; and the third solvent is selected from alcohols or hydrocarbons having 1 to 10 carbon atoms, and more preferably alcohols having 1 to 8 carbon atoms. Incidentally, when the first solvent is a mixed solution of two or more solvents, it is also acceptable that no second solvent is contained therein. The first solvent is further preferably methyl acetate, acetone, methyl formate, or ethyl formate, or a mixture thereof. The second solvent is preferably methyl ethyl ketone, cyclopentanone, cyclohexanone, or acetyl methyl acetate, and it may be a mixed solvent thereof.

Alcohols which are the third solvents may be straight-chain, branched, or cyclic. Out of these, they are preferably saturated aliphatic hydrocarbons. Alcohols may have any of primary to tertiary hydroxyl groups. Examples of alcohol may include methanol, ethanol, 1-propanol, 2-propanol, 1-butanol, 2-butanol, t-butanol, 1-pentanol, 2-methyl-2-butanol, and cyclohexanol. Incidentally, as alcohols, fluorine type alcohols are also used. Examples thereof may include 2-fluoroethanol, 2,2,2-trifluoroethanol, and 2,2,3,3-tetrafluoro-1-propanol. Further, hydrocarbons may be straight-chain, branched, or cyclic. Either of aromatic hydrocarbons and aliphatic hydrocarbons may be used. The aliphatic hydrocarbons may be saturated or unsaturated. Examples of hydrocarbons may include cyclohexane, hexane, benzene, toluene, and xylene. The alcohols and hydrocarbons which are the third solvents may be used alone, or in mixture of two or more thereof, and have no particular restriction. As preferred specific compounds as the third solvents, mention may be made of, as alcohols, methanol, ethanol, 1-propanol, 2-propanol, 1-butanol, 2-butanol, and cyclohexanol, cyclohexane, and hexane. Particularly, mention may be made of methanol, ethanol, 1-propanol, 2-propanol, and 1-butanol.

The mixing ratios of the three mixed solvents described above are as follows: based on the total amount of the mixed solvents, preferably, the first solvent is contained in a content of 20 to 95 mass %; the second solvent, 2 to 60 mass %; and further the third solvent, 2 to 30 mass %; further preferably, the first solvent is contained in an amount of 30 to 90 mass %; the second solvent, 3 to 50 mass %; and further the third alcohol, 3 to 25 mass %. Further, in particular preferably, the first solvent is contained in an amount of 30 to 90 mass %; the second solvent, 3 to 30 mass %; and the third solvent is an alcohol, and contained in an amount of 3 to 15 mass %. The foregoing non-chlorine type organic solvents for use in the invention are further described in details on p. 12 to 16 in Journal of Technical Disclosure (KOUKAI GIHOU) from Japan Institute of Invention and Innovation, Technical Disclosure No. 2001-1745, (published on Mar. 15, 2001, Institute of Invention and Innovation). Non-limiting preferred examples of the combinations of non-chlorine type organic solvents may include the following:

Methyl acetate/acetone/methanol/ethanol/butanol (75/10/5/5/5, parts by mass),

Methyl acetate/acetone/methanol/ethanol/propanol (75/10/5/5/5, parts by mass),

Methyl acetate/acetone/methanol/butanol/cyclohexane (75/10 5/5/5, parts by mass), Methyl acetate/acetone/ethanol/butanol (81/8/7/4, parts by mass), Methyl acetate/acetone/ethanol/butanol (82/10/4/4, parts by mass), Methyl acetate/acetone/ethanol/butanol (80/10/4/6, parts by mass), Methyl acetate/methyl ethyl ketone /methanol/butanol (80/10/5/5, parts by mass), Methyl acetate /acetone/methyl ethyl ketone/ethanol/isopropanol (75/8/5/5/7, parts by mass), Methyl acetate/cyclopentanone/methanol/isopropanol (80/7/5/8, parts by mass), Methyl acetate/acetone/butanol (85/10/5, parts by mass), Methyl acetate/cyclopentanone/acetone/methanol/butanol (60/15/14/5/6, parts by mass), Methyl acetate/cyclohexanone/methanol/hexane (70/20/5/5, parts by mass), Methyl acetate/methyl ethyl ketone/acetone/methanol/ethanol (50/20/20/5/5, parts by mass), Methyl acetate/1,3-dioxolane/methanol/ethanol (70/20/5/5, parts by mass), Methyl acetate/dioxane/acetone/methanol/ethanol (60/20/10/5/5, parts by mass), Methyl acetate/acetone/cyclopentanone/ethanol/isobutanol/cyclohexane (65/10/10/5/5/5, parts by mass), Methyl formate/methyl ethyl ketone/acetone/methanol/ethanol (50/20/20/5/5, parts by mass), Methyl formate/acetone/ethyl acetate/ethanol/butanol/hexane (65/10/10/5/5/5, parts by mass), Acetone/methyl acetoacetate/methanol/ethanol (65/20/10/5, parts by mass), Acetone/cyclopentanone/ethanol/butanol (65/20/10/5, parts by mass), Acetone/1,3-dioxolane/ethanol/butanol (65/20/10/5, parts by mass), and 1,3-Dioxolane/cyclohexanone/methyl ethyl ketone/methanol/butanol (55/20/10/5/5/5, parts by mass).

Further, there can be also used a cellulose acylate solution prepared with the following methods:

A method in which with methyl acetate/acetone/ethanol/butanol (81/8/7/4, parts by mass), a cellulose acylate solution is produced, and filtrated/concentrated, and then 2 parts by mass of butanol is additionally added thereto;

A method in which with methyl acetate/acetone/ethanol/butanol (84/10/4/2, parts by mass), a cellulose acylate solution is produced, and filtrated/concentrated, and then 4 parts by mass of butanol is additionally added thereto; and A method in which with methyl acetate/acetone/ethanol (84/10/6, parts by mass), a cellulose acylate solution is produced, and filtrated/concentrated, and then 5 parts by mass of butanol is additionally added thereto.

The dope for use in the invention may be allowed to contain, other than the non-chlorine type organic solvents of the invention, dichloromethane in an amount of 10 mass % or less based on the total amount of the organic solvents of the invention.

{Cellulose Acylate Solution Characteristics}

A cellulose acylate solution is preferably a solution obtained by dissolving cellulose acylate in the organic solvent in a concentration of 10 to 30 mass % from the viewpoint of the suitability for film formation and casting. The concentration is more preferably 13 to 27 mass %, and in particular preferably 15 to 25 mass %. A process for controlling cellulose acylate to these concentrations may be carried out in the following manner. A prescribed concentration is achieved at the stage of dissolution. Alternatively, a low concentration solution (e.g., 9 to 14 mass %) is previously produced, and then, it is controlled into a prescribed high concentration solution in a concentration step described later. Further, a high concentration cellulose acylate solution is previously produced, and then it is adjusted into a prescribed low concentration cellulose acylate solution by adding various additives thereto. Any method presents no particular problem so long as it is carried out so as to achieve the cellulose acylate solution concentration of the invention.

Then, the aggregate molecular weight of cellulose acylate in a dilute solution obtained by adjusting the cellulose acylate solution to 0.1 to 5 mass % with an organic solvent of the same composition is preferably 150,000 to 15,000,000. Further preferably, the aggregate molecular weight is 180,000 to 9,000,000. The aggregate molecular weight can be determined by the static light scattering method. Dissolution is preferably carried out so that the inertial square radius determined simultaneously at this step is 10 to 200 nm. The further preferred inertial square radius is 20 to 200 nm. Still further, dissolution is carried out preferably so that the second virial coefficient is $-2\times10^{-4}$ to $+4\times10^{-4}$, and more preferably so that the second virial coefficient is $-2\times10^{-4}$ to $+2\times10^{-4}$.

Herein, a description will be given to the definitions of the aggregate molecular weight, and further the inertial square radius and the second virial coefficient in the invention. These are measured by the use of the static light scattering method according to the following method. The measurements are performed in the dilute region for convenience of the device. However, these measured values reflect the behavior of the dope in the high concentration region of the invention.

First, cellulose acylate is dissolved in a solvent to be used in the dope to prepare 0.1-mass %, 0.2-mass %, 0.3-mass %, and 0.4-mass % solutions. Incidentally, weighing is carried out by using cellulose acylate dried at 120° C. for 2 hours, at 25° C. and 10% RH in order to prevent moisture absorption. The dissolution method is carried out according to the method (ordinary temperature dissolution method, cooling dissolution method, or high temperature dissolution method) adopted for dope dissolution. Subsequently, these solutions and solvents are filtrated through a filter made of 0.2-μm Teflon (registered trade name). Then, the static light scattering is measured for each filtrated solution by means of a light scattering measuring device (DLS-700, manufactured by OTSUKA ELECTROCNICS Co., Ltd.) at 25° C. at intervals of 10 degrees from 30 degrees to 140 degrees. The obtained data is analyzed by the BERRY plotting method. Incidentally, as the refractive index necessary for this analysis, the value of a solvent determined with an Abbe refractometer is used. As the concentration gradient of the refractive index (dn/dc) is measured by using the solvent and the solution used for the light scattering measurement by means of a differential refractometer (DRM-1021, manufactured by Otsuka Electronics Co., Ltd.).

Then, a method for manufacturing the cellulose acylate film of the invention will be described.

The method for manufacturing the cellulose acylate film of the invention includes a stretching step, the stretching step being a step of carrying out a stretching treatment with the stretching ratios in biaxial directions orthogonal to each other set within respective specific ranges, and the stretching treatment temperature set within a specific range, characterized in that the thickness of the film after the stretching step falls within a specific range.

The manufacturing method of the invention can be used for manufacturing the cellulose acylate film of the invention, and in addition, it can also be used for manufacturing other cellulose acylate films. In the following description, a description will be given in accordance with manufacturing of the cellulose acylate film of the invention.

The cellulose acylate film of the invention is preferably manufactured by carrying out respective steps including steps of dope preparation and a stretching treatment.

{Dope Preparation}

Then, the preparation of a cellulose acylate solution (dope) will be described. The dissolution method of cellulose acylate has no particular restriction. It may be carried out at room temperature, and further with a cooling dissolution method or a high temperature dissolution method, or further a combination of these. As for these, the preparation methods of a cellulose acylate solution are described in, for example, JP-A-5-163301, JP-A-61-106628, JP-A-58-127737, JP-A-9-95544, JP-A-10-95854, JP-A-10-45950, JP-A-2000-53784, JP-A-11-322946, further, JP-A-11-322947, JP-A-2-276830, JP-A-2000-273239, JP-A-11-71463, JP-A-04-259511, JP-A-2000-273184, JP-A-11-323017, or JP-A-11-302388. As for the methods for dissolving cellulose acylate in an organic solvent described above, these techniques are also appropriately applicable to the invention so long as these are within the scope of the invention. The details thereof are carried out with the method described in details on p. 22 to 25 in Journal of Technical Disclosure (KOUKAI GIHOU) from Japan Institute of Invention and Innovation, Technical Disclosure No. 2001-1745, (published on Mar. 15, 2001, Institute of Invention and Innovation). Further, the dope solution of cellulose acylate of the invention is generally subjected to the solution concentration and the filtration, which is similarly described in details on p. 25 in Journal of Technical Disclosure (KOUKAI GIHOU) from Japan Institute of Invention and Innovation, Technical Disclosure No. 2001-1745, (published on Mar. 15, 2001, Institute of Invention and Innovation). Incidentally, when dissolution is carried out at high temperatures, the temperature is mostly equal to or more than the boiling point of the organic solvent to be used. In that case, the solution is used under pressure.

As for the cellulose acylate solution, when the solution has a viscosity and a dynamic storage elastic modulus within the respective ranges described below, it is easy to cast, and preferred. 1 mL of a sample solution is measured by means of a rheometer (CLS 500) with 4-cm dia/2° Steel Cone (both manufactured by TA Instruments Co.). The measurement is carried out under the measurement conditions of temperatures changeable at 2° C./min within the range of 40° C. to −10° C. with Oscillation Step/Temperature Ramp. Thus, the static non-Newtonial viscosity n*(Pa·S) at 40° C. and the storage elastic modulus G'(Pa) at −5° C. are determined. Incidentally, the sample solution is previously thermally insulated until the solution temperature becomes constant at the measurement starting temperature. Then, the measurement is started. In the invention, preferably, the viscosity at 40° C. is 1 to 400 Pa·S, and the dynamic storage elastic modulus at 15° C. is 500 Pa or more. More preferably, the viscosity at 40° C. is 10 to 200 Pa·S, and the dynamic storage elastic modulus at 15° C. is 100 to 1000,000 Pa. Further, a larger dynamic storage elastic modulus at low temperatures is more preferred. For example, when the metal support of the casting part is at −5° C., the dynamic storage elastic modulus is preferably 10,000 to 1000,000 Pa at −5° C. When the metal support of the casting part is at −50° C., the dynamic storage elastic modulus at −50° C. is preferably 10,000 to 5000,000 Pa.

In the invention, when the cellulose acylate is used, a high concentration dope can be obtained. Therefore, a cellulose acylate solution with a high concentration, and further excellent in stability can be obtained even without relying upon the means of concentration. In order to further facilitate the dissolution, it is also acceptable that the dissolution is carried out with a low concentration, and then concentration is carried out by using a concentration means. The concentration method has no particular restriction. However, it can be carried out, for example, with the following methods: a method in which a low concentration solution is introduced between a cylinder body and the rotary locus of the outer circumference of a rotary blade rotating in a circumferential direction of the inside thereof, and a temperature difference is caused between the solution and it; thus, while evaporating the solvent, a high concentration solution is obtained (e.g., JP-A-4-259511), a method in which a heated low concentration solution is sprayed from a nozzle into a container, and the solvent is flash evaporated during the period until the solution from the nozzle hits the container inner wall, and the solvent vapor is extracted from the container, and a high concentration solution is extracted from the container bottom (the method described in, for example, U.S. Pat. Nos. 2,541,012, 2,858,229, 4,414,341, and 4,504,355).

The solution is preferably subjected to filtration to remove foreign matters such as undissolved matters, dust, and impurities by the use of an appropriate filter of gauze, flannel, or the like prior to casting. For the filtration of the cellulose acylate solution, a filter with an absolute filtration accuracy of 0.1 to 100 μm is preferably used, and further, a filter with an absolute filtration accuracy of 0.5 to 25 μm is preferably used. The thickness of the filter is preferably 0.1 to 10 mm, and further preferably 0.2 to 2 mm. In that case, the filtration pressure is preferably 1.6 MPa or less, more preferably 1.2 MPa or less, further preferably 1.0 MPa or less, and in particular preferably 0.2 MPa or less. For the filters, there can be preferably used conventionally known materials such as glass fiber, cellulose fiber, filter paper, fluororesin such as tetrafluoroethylene. Particularly, ceramics, metals, and the like are preferably used. Any viscosity immediately before film formation of the cellulose acylate solution is acceptable so long as it falls within such a range as to allow casting for film formation. In general, it is prepared in the range of preferably 10 Pa·S to 2000 Pa·S, more preferably 30 Pa·S to 1000 Pa·S, and further preferably 40 Pa·S to 500 Pa·S. Incidentally, the temperature at this step has no particular restriction so long as it is the temperature at the time of casting. However, it is preferably −5 to +70° C., and more preferably −5 to +55° C.

{Film Formation}

The cellulose acylate film of the invention can be obtained by carrying out film formation using the cellulose acylate solution. As the film forming method and equipment, there are used the solution casting film forming method and the solution casting film forming apparatus conventionally made available for manufacturing of a cellulose triacetate film. The prepared dope (cellulose acylate solution) from a dissolution apparatus (tank) is once stored in a storage tank. Then, the foams contained in the dope are removed for final preparation. The dope is fed from a dope outlet through, for example, a pressing type metering gear pump capable of quantitative solution feeding with high precision according to the number of revolutions, to a press type die. The dope is evenly cast from the nozzle (slit) of the press type die onto the metal support of the casing part running endlessly. At the peeling point at which the metal support has almost completed one revolution, the dope film not completely dried (which is also referred to as a web) is peeled off from the metal support. The opposite sides of the resulting web are fixed with clips, so that the web is transferred by a tenter while holding the width, and dried. Subsequently, the web is transferred with a roll group of a drying apparatus to complete drying. Then, it is wound in a prescribed length by a winder. The combination of the tenter and the drying apparatus of the roll group varies according to the intended purpose. In the solution casting film forming method to be used for a functional protective film for an electronic display, other than the solution casting film forming apparatus, a coating apparatus is often added thereto for the surface processing of the film such as an undercoat layer, an antistatic layer, an antihalation layer, or a protective layer. Below, each manufacturing step will be described simply. However, the invention is not limited thereto.

First, for forming the prepared cellulose acylate solution (dope) into a cellulose acylate film by a solvent cast method, the dope is cast onto a drum or a band, and the solvent is evaporated to form a film. The dope before casting is preferably adjusted in concentration so that the solid content is 5 to 40 mass %. The surface of the drum or the band is preferably finished in a mirror state. The dope is preferably used in such as manner as to be cast on a drum or a band having a surface temperature of 30° C. or less. Particularly, the metal support temperature is preferably −10 to 20° C. Further, the methods described in each publication of JP-A-2000-301555, JP-A-2000-301558, JP-A-07-032391, JP-A-03-193316, JP-A-05-086212, JP-A-62-037113, JP-A-02-276607, JP-A-55-014201, JP-A-02-111511, and JP-A-02-208650 can be used in the invention.

{Multilayer Casting}

The cellulose acylate solution may be cast as a monolayer solution on a smooth band or drum as the metal support. Alternatively, two or more layers of a plurality of cellulose acylate solutions may be cast. When a plurality of cellulose acylate solutions are cast, a film may be manufactured while casting cellulose acylate-containing solutions respectively from a plurality of casting ports provided at intervals in the direction of advance of the metal support for lamination. For example, the method described in each publication of JP-A-61-158414, JP-A-1-122419, and JP-A-11-198285 is applicable. Alternatively, a film may be formed by casting cellulose acylate solutions from two casting port. This process can be carried out with the method described in each publication of, for example, JP-B-60-27562, JP-A-61-94724, JP-A-61-947245, JP-A-61-104813, JP-A-61-158413, and JP-A-6-134933. Whereas, the following cellulose acylate film casting method described in JP-A-56-162617 is also acceptable. Namely, the flow of a high viscosity cellulose acylate solution is covered by a low viscosity cellulose acylate solution, and the high and low viscosity cellulose acylate solutions are simultaneously extruded. Still further, the process in which the outer solution contains a larger amount of an alcoholic component which is a poor solvent than the inner solution described in each publication of JP-A-61-94724 and JP-A-61-94725 is also a preferred embodiment. Alternatively, the following process is also acceptable. Namely, using two casting ports, the film formed on the metal support by the first casting port is peeled, and a second casting is carried out on the side in contact with the metal support surface. This is the method described in, for example, JP-B-44-20235. The cellulose acylate solutions to be cast may be the same solution, or different cellulose acylate solutions, and thus they have no particular restriction. In order for a plurality of cellulose acylate layers to have functions, the cellulose acylate solutions corresponding to the respective functions may be extruded from their respective casting ports. Further, casting of the cellulose acylate solutions can be carried out simultaneously with other functional layers (e.g., an adhesive layer, a dye layer, an antistatic layer, an antihalation layer, a UV absorption layer, and a polarizing layer).

For a conventional monolayer solution, extrusion of a high-concentration high viscosity cellulose acylate solution is necessary for achieving the necessary film thickness. In that case, the cellulose acylate solution may be inferior in stability, so that solid matters are generated. As a result, unfavorably, often, pimple defects are formed, or the flatness is defective. As the solution thereof, by casing a plurality of cellulose acylate solutions from the casting ports, it is possible to simultaneously extrude high viscosity solutions on the metal support. Thus, not only the flatness is improved and a film having an excellent surface condition can be manufactured, but also the reduction of drying load can be achieved by the use of the concentrated cellulose acylate solutions. As a result, the production speed of the film can be enhanced. For co-casting, the thicknesses of the inner side and the outer side have no particular restriction. However, preferably, the thickness of the outside film accounts for preferably 1 to 50%, and more preferably 2 to 30% of the total film thickness. Herein, in the case of co-casting of three or more layers, the total film thickness of the layer in contact with the metal support and the layer in contact with the air side is defined as the outside thickness. In the case of co-casting, cellulose acylate solutions different in concentration of additives such as the plasticizer, ultraviolet absorber, and mat agent can be co-cast to manufacture a cellulose acylate film of a lamination structure. For example, it is possible to form a cellulose acylate film with a configuration of skin layer/core layer/skin layer. For example, the mat agent is contained in large amounts in the skin layer, or it can be added only to the skin layer. The plasticizer or the ultraviolet absorber can be added to the core layer in larger amounts than to the skin layer, or it may be added only to the core layer. Whereas, the types of the plasticizer or the ultraviolet absorber may be varied between the core layer and the skin layer. For example, the skin layer can be allowed to contain a low volatile plasticizer and/or ultraviolet absorber, and to the core layer, a plasticizer excellent in plasticity, or an ultraviolet absorber excellent in ultraviolet absorption property can be added. Further, inclusion of a release accelerator in only the skin layer on the metal support side is also a preferred embodiment. Further, the following procedure is also preferred. Namely, in order to cool the metal support with a cooling drum method, and gelling the solution, an alcohol which is a poor solvent is added to the skin layer in larger amounts than to the core layer. The skin layer and the core layer may have different Tg's. The Tg of the core layer is preferably lower than the Tg of the skin layer. Further, the viscosity of the solution containing cellulose acylate during casting may vary between the skin layer and the core layer. The viscosity of the skin layer is preferably smaller than the viscosity of the core layer. However, it is also acceptable that the viscosity of the core layer is smaller than the viscosity of the skin layer.

{Casting}

The casting methods of the solution include: a method in which the prepared dope is evenly extruded from a pressing die onto the metal support; a method by a doctor blade in which the dope once cast on the metal support is controlled by a blade in film thickness; a method by a reverse roll coater in which control is carried out by means of a counterrotating roll, or other methods. However, the method by means of a pressing die is preferred. The pressing dies include a coat-hanger type, T die type, and other types. However, any can be preferably used. Alternatively, casting can be carried out with, other than the methods mentioned herein, various conventionally known methods for casting a cellulose triacetate solution for film formation. By setting respective conditions by allowing for the differences in the boiling point between solvents used, and the like, it is possible to obtain the same effects as the contents described in respective publications. As the metal supports running endlessly to be used for manufacturing the cellulose acylate film of the invention, there is used a drum having a surface mirror-finished with chrome plating, or a stainless steel belt (which can also be referred to as a band) mirror-finished by surface polishing. One, or two or more pressing dies to be used for manufacturing the cellulose acylate film of the invention may be set above the metal support. Preferably, one or two dies are set. When two or more dies are set, the amount of the dope to be cast may be divided in various ratios between respective dies, and the dope may be fed in respective ratios from a plurality of precision metering gear pumps. The temperature of the cellulose acylate solution to be used for casting is preferably −10 to 55° C., and more preferably 25 to 50° C. In that case, all the steps may be the same, or the steps may be different in respective points from one another. When there are differences therebetween, it is essential only that a desirable temperature can be achieved immediately before casting.

{Drying}

Drying of the dope on the metal support in accordance with manufacturing of the cellulose acylate film is generally accomplished by the following methods: a method in which a hot air is applied from the surface side of the metal support (drum or belt), i.e., from the surface of the web on the metal support; a method in which a hot air is applied from the rear side of the drum or the belt; a liquid heat transfer method in which a temperature-controlled liquid is brought in contact with the rear side of the belt or the drum, which is the opposite side from the dope cast side, thereby to heat the drum or the belt by heat transfer for controlling the surface temperature; and other methods. However, the rear side liquid heat transfer method is preferred. The surface temperature of the metal support prior to casting may be any temperature so long as it is equal to, or less than the boiling point of the solvent used in the dope. However, in order to promote drying, or in order to eliminate the fluidity on the metal support, the temperature is preferably set at a temperature lower by 1 to 10° C. than the boiling point of the solvent having the lowest boiling point out of the solvents used. Incidentally, this does not apply to the case where the cast dope is released off without cooling nor drying.

{Stretching Treatment}

The stretching treatment is, as described above, carried out by setting the stretching ratios in biaxial directions orthogonal to each other set within respective specific ranges, and setting the stretching treatment temperature within a specific range.

The wording "stretching ratios in biaxial directions orthogonal to each other" represents those in the MD direction (casting direction) and the TD direction (direction orthogonal to the MD direction i.e. width direction).

As for the cellulose acylate film of the invention, the retardation can be adjusted by a stretching treatment. Further, there is also a method for positively stretching the film in the width direction, and it is described in, for example, each publication of JP-A-62-115035, JP-A-4-152125, JP-A-4-284211, JP-A-4-298310, and JP-A-11-48271. With this, the manufactured film is stretched in order to set the in-plane retardation value of the cellulose acylate film at a high value.

Further, JP-A-2003-014933 describes as follows. As a stretching method, there can be preferably used a transverse stretching machine referred to as a tenter, whereby the opposite sides of the web are fixed with clips or pins, and the spacing between the clips or the pins is expanded transversely for transverse stretching. Whereas, the following is also disclosed. Longitudinal stretching or shrinking can be carried out by expanding or shrinking the spacing between the clips or pins in the direction of transport (longitudinally) by the use of a simultaneous biaxial stretching machine. Further, when the clip portions are driven by a linear drive system, stretching can be carried out smoothly, and the risk of rupture or the like can be reduced. Therefore, this case is preferable. Whereas, the following is also shown. As the method for longitudinal stretching, there can also be used a method in which a difference is caused in circumferential velocity between a plurality of rolls, and longitudinal stretching is carried out by the use of the difference in roll circumferential velocity therebetween. Incidentally, it is also possible to use these stretching methods in a composite manner. It is described that the stretching step can be divided into two or more stages to be carried out as with (longitudinal stretching, transverse stretching) or (longitudinal stretching, longitudinal stretching).

The temperature of the stretching treatment of the film is equal to, or more than the temperature higher by 25° C. than the glass transition temperature (Tg) of the film, and equal to or less than the crystallization temperature. The temperature of the stretching treatment represents the surface temperature of the film itself at stretching.

By achieving the temperature within this range, it is possible to reduce the haze in the case of a thin film manufactured by high ratio stretching.

The stretching ratios are 1.2 to 4.0 and 1.05 to 3.8 for the biaxial directions MD direction and TD direction, respectively. The preferred stretching ratios are 1.2 to 3.0 and 1.2 to 2.8, respectively, and in particular preferably 1.2 to 2.0 and 1.2 to 1.8, respectively. By setting the stretching ratios within the specific ranges, it is possible to implement a thin and high elastic modulus cellulose acylate film, and it is possible to obtain a film which is excellent in developability of the in-plane and thickness-direction retardation, and is easy to handle for manufacturing and processing. Further, when the stretching ratios are less than 1.2 and 1.05, respectively, it becomes difficult to satisfy desirable optical characteristics. When the stretching ratios exceed 4.0 and 3.8, respectively, rupture during stretching may occur.

Whereas, at least one stretching velocity of the biaxial directions orthogonal to each other is preferably 10%/min, and further preferably 10 to 3%/min. By achieving this range, it is possible to make the haze small even for a thin film manufactured by high ratio stretching. Specifically, in at least one of the MD direction and the TD direction, the stretching velocity is required to be set at 10%/min. However, when in any one direction, the stretching velocity falls within this range, the other stretching velocity has no particular restriction. More preferably, in both directions, the stretching velocity is set within this range.

The birefringence of the film is preferably such that the refractive index in the width direction is larger than the refractive index of the direction of length. Therefore, the film is preferably stretched to a greater degree in the width direction. Whereas, the stretching treatment may be carried out halfway during the film formation step, or the original roll wound after film formation may be subjected to a stretching treatment. In the former case, stretching may be carried out with a residual amount of the solvent being contained therein. Stretching can be carried out preferably with a residual solvent amount of 2 to 30%.

The drying and the control of the surface temperature of the film during stretching are effective means for obtaining a cellulose acylate film producing the desirable effects of the invention. In general, the glass transition temperature (Tg) of the film tens to increase as the drying of the cellulose acylate film proceeds, and the amount of the solvent (volatile component) in the film is reduced. Effectively, the heating temperature during drying or stretching is set so that the surface temperature of the film exceeds the glass transition temperature in any step of the drying initial step (the period during which the volatile components is in an amount of around 70% (based on the dry mass)), the stretching step, and the drying final step (the period during which the volatile component is in an amount of almost 0 mass %).

Particularly, it is effective that the surface temperature of the film is set at a specific value in the stretching step. Namely, in the stretching step, the surface temperature of the film is set to be equal to or higher than the Tg of the film by 25° C. and to be equal to or less than the crystallization temperature. The film surface is preferably temperature controlled so as to be higher by 25° C. to 200° C., further preferably temperature controlled so as to be higher than the Tg of the film by 40 to 150° C., and in particular preferably temperature controlled so as to be higher than the Tg of the film by 60 to 100° C.

Incidentally, the glass transition temperature (Tg) is the value determined in the following manner. By using a differential scanning calorimeter (DSC), the temperature of the point of inflection on the lower temperature side of the endothermic (exothermic) curve measured under the following conditions is determined from the point of intersection between tangents to the curve. The crystallization temperature (Tc) is the value obtained by reading the temperature of the top of the exothermic peak occurring on the high temperature side of the Tg.

| | |
|---|---:|
| Container Closed container made of stainless steel | 70 μl |
| Measurement mode | Modulated DSC |
| Scanning temperature region | −50 to 200° C. |
| Heating rate | 2° C./min |
| Cooling rate | 20° C./min |
| Amplitude during heating | ±1° C. |
| Amplitude cycle | 80 seconds |

Whereas, the surface temperature of the film is the temperature of the film surface measured by means of a non-contact infrared thermometer. In general, the surface temperature of the film tends to be lower than the air supply temperature of the drying zone. Particularly, this tendency is intensified under the influence of the evaporation latent heat in the period in which the volatile component content is high. Therefore, it is important to control the surface temperature by the actual measurement.

As described above, the film thickness of the cellulose acylate film of the invention is characterized by being 20 to 70 μm. Also when the cellulose acylate film of the invention is manufactured in accordance with the manufacturing method of the invention, the film thickness of the cellulose acylate film obtained after the stretching step is 20 to 70 μm. The film thickness is further preferably 30 to 60 μm, and most preferably 30 to 50 μm. When the film thickness is less than 20 μm, it becomes difficult to handle the film due to problems of wrinkles upon bonding even if the elastic modulus is properly controlled within the prescribed ranges of the invention.

Whereas, as described above, the elastic modulus in at least one direction of the film casting direction and width direction of the cellulose acylate film of the invention is 3.5 to 10 GPa, further preferably 4 to 7 GPa, and most preferably 4 to 6 GPa. When it is less than 3.5 GPa, and a thin film is formed, sagging, wrinkles, and bending may occur upon processing into a polarizing plate, or upon bonding to a liquid crystal display device. On the other hand, when the elastic modulus exceeds 10 GPa, chips may occur upon punching of slits in the film or a polarizing plate. By setting the stretching ratio within a specific range, it is possible to implement the cellulose acylate film which is thin as described above, and has a specific high elastic modulus as described above.

Whereas, the haze of the cellulose acylate film of the invention is preferably 1% or less, and further preferably 0.7% or less.

When the haze is 1% or less, the resolution and the contrast of an image will not be reduced for using the film on a liquid crystal display device. Therefore, this case is preferable. The haze can be set within the foregoing range by carrying out biaxial stretching at a temperature of equal to or more than the glass transition temperature +25° C., and of equal to or less than the crystallization temperature, or carrying out biaxial stretching at a stretching velocity of 10%/min or less.

On the other hand, the in-plane retardation Re at a wavelength of 589 nm of the film falls preferably within the range of 20 to 80 nm, more preferably within the range of 25 to 75 nm, and further preferably within the range of 30 to 70 nm. The retardation in a thickness-direction Rth falls preferably within the range of 100 to 250 nm, more preferably within the range of 110 to 190 nm, and further preferably within the range of 120 to 180 nm.

In this specification, Re(λ), and Rth(λ) represent the in-plane retardation and the retardation in a thickness-direction. Re(λ) is measured by means of KOBRA 21ADH or WR (manufactured by Oji Scientific Instruments Co., Ltd.) for light with a wavelength of λ nm made incident in the direction of film normal. Rth(λ) is calculated by means of KOBRA 21ADH or WR based on the following retardation values measured at a total of 6 positions, the hypothetical value of the average refractive index, and the inputted film thickness value. The retardation values are measured for light with a wavelength of λ nm made incident from the directions tilted respectively in steps of 10 degrees from the normal direction toward 50 degrees on one side relative to the film normal direction with the in-plane slow axis (judged by KOBRA 21ADH or WR) as a tilt axis (rotational axis) (when there is no slow axis, a given film in-plane direction is taken as the rotational axis). Incidentally, Rth can also be calculated according to the following equations (1) and (2) based on the following retardation values, the hypothetical value of the average refractive index, and the inputted film thickness value. The retardation values are measured from given two directions with the slow axis as a tilt axis (rotational axis) (when there is no slow axis, a given film in-plane direction is taken as the rotational axis). Herein, as the hypothetical values of the average refractive index, the values in POLYMER HANDBOOK, (JOHN WILEY & SONS, INC), and catalogues of various optical films can be used. When the values of the average refractive index are not known, they can be measured by means of an Abbe refractormeter. The values of the average refractive indices of main optical films will be exemplified below: cellulose acylate (1.48), cycloolefin polymer (1.52), polycarbonate (1.59), polymethyl methacrylate (1.49), and polystyrene (1.59). By inputting the hypothetical values of the average refractive index and the film thickness, KOBRA 21ADH or WR calculates nx, ny, and nz. From the calculated nx, ny, and nz, Nz=(nx−nz)/(nx−ny) is further calculated.

$$Re(\theta) = \left[ nx - \frac{ny \times nz}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Equation (1)

Re(θ) in the equation (1) represents the retardation value in the direction tilted at an angle θ from the normal direction.

$$Rth = ((nx+ny)/2 - nz) \times d$$

Equation (2)

The adjustment of the film thickness can be accomplished by adjusting the concentration of solid content contained in the dope, the intervals between slits of nozzles of the die, the extrusion pressure from the die, the metal support speed, and the like so as to achieve a desirable thickness. The width of the cellulose acylate film obtained in the foregoing manner is preferably 0.5 to 3 m, more preferably 0.6 to 2.5 m, and further preferably 0.8 to 2.2 m. The length of the film to be wound per roll is preferably 100 to 10000 m, more preferably 500 to 7000 m, and further preferably 1000 to 6000 m. For winding, a knurling is preferably provided at least on one end. The width is preferably 3 mm to 50 mm, and more preferably 5 mm to 30 mm. The height is preferably 0.5 to 500 μm, and more preferably 1 to 200 μm. For this, either single pressing or double pressing is acceptable.

The variations in Re value along the entire width is preferably ±5 nm, and further preferably ±3 nm. Whereas, the variations in Rth value is preferably ±10 nm, and further preferably ±5 nm. Whereas, the variations in Re value and Rth value along the direction of length also preferably fall within the range of the variations along the width direction.

<Polarizing Plate>

Then, the polarizing plate of the invention will be described.

The polarizing plate of the invention is the one using at least one of the cellulose acylate films of the invention as the protective film of the polarizing film.

The polarizing plate generally includes a polarizing film, and a pair of protective films disposed on the opposite sides thereof and interposing the polarizing film therebetween. Then, in the invention, as at least one protective film, the cellulose acylate film of the invention is used. As the other protective film, the cellulose acylate film of the invention may be used, or a general cellulose acetate film may be used.

The polarizing films include an iodine type polarizing film, and a dye type polarizing film and a polyene type polarizing film using a dichroic dye. The iodine type polarizing film and the dye type polarizing film are generally manufactured by the use of a polyvinyl alcohol type film.

When the cellulose acylate film of the invention is used as a protective film for the polarizing plate, the manufacturing method of the polarizing plate has no particular restriction, and the polarizing plate can be manufactured with a common method. For example, there is the following method: the obtained cellulose acylate films are subjected to an alkali treatment, and bonded by the use of a fully saponified polyvinyl alcohol aqueous solution to the opposite sides of the polarizing film manufactured by immersing a polyvinyl alcohol film in an iodine solution for stretching. In place of the alkali treatment, the easy adhesion processing as described in JP-A-6-94915 and JP-A-6-118232 may be performed. Examples of the adhesive to be used for boning the protective film treated side and the polarizing film may include polyvinyl alcohol type adhesives such as polyvinyl alcohol and polyvinyl butyral, and vinyl type latexes such as butyl acrylate.

The polarizing plate includes a polarizing film, and protective films protecting the opposite sides thereof. Further, the polarizing plate may be configured such that a protective film is bonded on one side of the polarizing plate, and a separate film is bonded on the opposite side thereof. The protective film and the separate film are used for the purpose of protecting the polarizing plate during the shipment of the polarizing plates, during the product inspection, or the like. In this case, the protective film is bonded for the purpose of protecting the surface of the polarizing plate, and it is used on the side of the polarizing plate opposite from the side to be bonded to the liquid crystal plate. Whereas, the separate film is used for the purpose of covering the adhesion layer to be bonded to the liquid crystal plate, and it is used on the surface side of the polarizing plate to be bonded to the liquid crystal plate.

The cellulose acylate film of the invention is preferably bonded to the polarizing film in the following manner. Namely, bonding is achieved so that the transmission axis of the polarizing film is in alignment with the slow axis of the cellulose acylate film of the invention.

Incidentally, for the polarizing plate manufactured under polarizing plate crossed nicols, when the orthogonality precision between the slow axis of the cellulose acylate film of the invention and the absorption axis (axis orthogonal to the transmission axis) of the polarizing film exceeds 1°, the polarization degree performance under polarizing plate crossed nicols is reduced, and light leakage occurs. When the polarizing plate is combined with a liquid crystal cell, sufficient black level and contrast cannot be obtained. For this reason, the direction of the main refractive index nx of the cellulose acylate film of the invention and the direction of the transmission axis of the polarizing plate deviate from each other by 1° or less, and preferably by 0.50 or less.

The polarizing plate of the invention preferably satisfies at least one or more of the following expressions (a) to (d):
(a) $40.0 \leq TT \leq 45.0$;
(b) $30.0 \leq PT \leq 40.0$;
(c) $CT \leq 2.0$; and
(d) $95.0 \leq P$ where in the expressions, TT represents the single plate transmittance; PT, the parallel transmittance; CT, the orthogonal transmittance; and P, the degree of polarization, at 25° C. and 60% RH.

The single plate transmittance TT, the parallel transmittance PT, and the orthogonal transmittance CT are, in this order, more preferably $40.5 \leq TT \leq 45$, $32 \leq PT \leq 39.5$, and $CT \leq 1.5$, and further preferably $41.0 \leq TT \leq 44.5$, $34 \leq PT \leq 39.0$, and $CT \leq 1.3$, respectively. The degree of polarization P is preferably 95.0% or more, more preferably 96.0% or more, and further preferably 97.0% or more.

The polarizing plate of the invention preferably satisfies at least one or more of the following expressions (e) to (g):
(e) $T(380) \leq 2.0$;
(f) $T(410) \leq 1.0$; and
(g) $T(700) \leq 0.5$, where $T(\lambda)$ such as $T(380)$, $T(410)$, or $T(700)$ represents the orthogonal transmittance at a wavelength of $\lambda$, such as 380, 410, or 700, respectively.

More preferably, $T(380) \leq 1.95$; $T(410) \leq 0.9$; and $T(700) \leq 0.49$, and further preferably, $T(380) \leq 1.90$; $T(410) \leq 0.8$; and $T(700) \leq 0.48$.

The polarizing plate of the invention preferably satisfies at least one or more of the following expressions (j) and (k):
(j) $-6.0 \leq \Delta CT \leq 6.0$; and
(k) $-10.0 \leq \Delta P \leq 0.0$ where $\Delta CT$ represents the amount of change in orthogonal single plate transmittance, and $\Delta P$ represents the amount of change in degree of polarization, when the polarizing plate has been allowed to stand still for 500 hours under the conditions of 60° C. and 95% RH, (provided that the amount of change represents the value obtained by subtracting the measured value before the test from the measured value after the test)

More preferably, $-5.8 \leq \Delta CT \leq 5.8$ and $-9.5 \leq \Delta P \leq 0.0$, and further preferably, $-5.6 \leq \Delta CT \leq 5.6$ and $-9.0 \leq \Delta P \leq 0.0$.

The polarizing plate of the invention preferably satisfies at least one or more of the following expressions (h) and (i):
(h) $-3.0 \leq \Delta CT \leq 3.0$; and
(i) $-5.0 \leq \Delta P \leq 0.0$ where $\Delta CT$ represents the amount of change in orthogonal single plate transmittance, and $\Delta P$ represents the amount of change in degree of polarization, when the polarizing plate has been allowed to stand still for 500 hours under the conditions of 60° C. and 90% RH.

The polarizing plate of the invention preferably satisfies at least one or more of the following expressions (l) and (m):
(l) $-3.0 \leq \Delta CT \leq 3.0$; and
(m) $-2.0 \leq \Delta P \leq 0.0$ where $\Delta CT$ represents the amount of change in orthogonal single plate transmittance, and $\Delta P$ represents the amount of change in degree of polarization, when the polarizing plate has been allowed to stand still for 500 hours under the condition of 80° C.

As for the single plate transmittance TT, the parallel transmittance PT, and the orthogonal transmittance CT, the measurements are carried out at a wavelength in the range of 380 nm to 780 nm by means of UV3100PC (manufactured by Shimadzu Corporation). For every of TT, PT, and CT, each average value of 10 measurements (average value at 400 nm to 700 nm) is used. The polarizing plate durability tests are carried out in two forms of (1) only a polarizing plate, and (2) a polarizing plate bonded on glass via an adhesive in the following manner. For the measurement of only a polarizing plate, there are prepared two same plates each configured such that two polarizing films are combined to cross each other at right angles so as to interpose the cellulose acylate film of the invention therebetween. For the polarizing plate being bonded on glass, there are prepared two samples (about 5 cm×5 cm) each configured such that the polarizing plate is bonded on glass so that the cellulose acylate film of the invention is on the glass side. For the single plate transmittance measurement, the measurement is carried out by setting the film side of the sample so as to face the light source. The two samples are measured, respectively, and the average value thereof is taken as the single plate transmittance.

{Surface Treatment}

The cellulose acylate film of the invention may be subjected to a surface treatment, which can achieve the improvement of the adhesion between the cellulose acylate film and respective functional layers (e.g., an undercoat layer and a back layer). Examples of the surface treatment usable may include a glow discharge treatment, an ultraviolet irradiation treatment, a corona treatment, a flame treatment, and an acid or alkali treatment. The glow discharge treatment herein referred to may be a low temperature plasma caused under a low pressure gas of $10^{-3}$ to 20 Torr (0.133 Pa to 2.66 kPa), and further preferably a plasma treatment under an atmospheric pressure. The plasma excitable gas denotes a gas that can be excited into plasma under the conditions as described above. Mention may be made of argon, helium, neon, krypton, xenon, nitrogen, carbon dioxide, flons such as tetrafluoromethane, mixtures thereof, and the like. These are described in details on p. 30 to 32 in Journal of Technical Disclosure (KOUKAI GIHOU) from Japan Institute of Invention and Innovation, Technical Disclosure No. 2001-1745, (published on Mar. 15, 2001, Institute of Invention and Innovation). Incidentally, in the plasma treatment under atmospheric pressure, which has received attentions in recent years, for example, an irradiation energy of 20 to 500 Kgy is used under 10 to 1000 Kev, and more preferably an irradiation energy of 20 to 300 Kgy is used under 30 to 500 Kev. Out of these, an alkali saponification treatment is particularly preferred, and it is very effective as the surface treatment of the cellulose acylate.

The alkali saponification treatment is preferably carried out by a method in which a cellulose acylate film is directly immersed in a bath of a saponification solution, or a method in which a saponification solution is coated on a cellulose acylate film. As the coating method, mention may be made of a dip coating method, a curtain coating method, an extrusion coating method, a bar coating method, and an E type coating method. As the solvent of the alkali saponification treatment coating solution, there is preferably selected a solvent which is good in wettability because the saponification solution is coated on a cellulose acylate film, and keeps the surface conditions favorable without forming unevenness on the cellulose acylate film surface by the saponification solution solvent. Specifically, an alcohol type solvent is preferred, and in particular, isopropyl alcohol is preferred. Whereas, an aqueous solution of a surfactant can also be used as a solvent. The alkali of the alkali saponification coating solution is preferably an alkali which is dissolved in the solvents, and further preferably KOH or NaOH. The pH of the saponification coating solution is preferably 10 or more, and further preferably 12 or more. The reaction conditions for alkali saponification are preferably, at room temperature, 1 second or more and 5 minutes or less, further preferably 5 seconds or more and 5 minutes or less, and in particular preferably 20 seconds or more and 3 minutes or less. After the alkali saponification reaction, preferably, the saponification solution coated side is washed with water, or washed with an acid, followed by water washing.

Whereas, the polarizing plate of the invention preferably includes at least one layer of a hard coat layer, an antiglare layer, and an antireflection layer provided on the surface of the protective film on the other side of the polarizing plate. Namely, when the polarizing plate is used for a liquid crystal display device, on the protective film disposed on the opposite side from the liquid crystal cell, a functional film such as an antireflection layer is preferably provided. As such a functional film, at least one layer of the hard coat layer, an antiglare layer, and antireflection layer is preferably provided. Incidentally, respective layers are not required to be provided as individual different layers. For example, the antiglare layer may be provided in the following manner. The antireflection layer or the hard coat layer is allowed to have the function, resulting in the antireflection layer and the antiglare layer.

[Antireflection Layer]

In the invention, there is preferably used at least an antireflection layer configured such that a light scattering layer and a low refractive index layer are stacked in this order on the protective film, or an antireflection layer configured such that an intermediate refractive index layer, a high refractive index layer, and a low refractive index layer are stacked in this order on the protective film. Below, preferred examples thereof will be shown.

{Antireflection Layer Including a Light Scattering Layer and a Low Refractive Index Layer Provided on the Protective Film}

Preferred examples of the antireflection layer including a light scattering layer and a low refractive index layer provided on the protective film will be described.

The light scattering layer preferably includes mat particles dispersed therein. The refractive index of the material of the portion of the light scattering layer other than the mat particles preferably falls within the range of 1.50 to 2.00. The refractive index of the low refractive index layer preferably falls within the range of 1.20 to 1.49. In the invention, the light scattering layer has both the antiglare property and the hard coat property, and it may be configured in a single layer, or a plurality of layers, e.g., 2 layers to 4 layers.

The antireflection film is preferably designed so that, in terms of the surface uneven shape, the center line average roughness Ra is 0.08 to 0.40 μm; the 10-point average roughness Rz, 10 times Ra, or less; the average peak to valley distance Sm, 1 to 100 μm; the standard deviation of the height of the concave portion from the deepest portion in the uneven surface, 0.5 μm or less; the standard deviation of the average peak to valley distance Sm with reference to the center line, 20 μm or less; and the side with a tilt angle of 0 to 5 degrees accounts for 10% or more. This is because sufficient antiglare property, and visual uniform mat feeling are achieved. Whereas, the tint of the reflection light under a C light source is such that: a* value, −2 to 2; b* value, −3 to 3, and the ratio between the minimum value and the maximum value of the reflectance within the range of −380 nm to 780 nm, 0.5 to 0.99. As a result, the tint of a reflection light becomes neutral, and preferred. Whereas, the b* value of the transmitted light under a C light source is 0 to 3. As a result, the yellow tinge in white display when the plate is applied to a display device is reduced, and preferred. Whereas, a grid of 120 μm×40 μm is inserted between on the surface illuminant and the antireflection film of the invention. Thus, the luminance distribution on the film is measured. When the standard deviation of the luminance distribution at this step is 20 or less, the glare when the film of the invention has been applied to a high definition panel is reduced, which is preferable.

The antireflection layer usable in the invention is preferable for the following reason. By setting the mirror reflectance at 2.5% or less, the transmittance at 90% or more, and the 60-degree glossiness at 70% or less in terms of the optical characteristics, it is possible to suppress the reflection of external light, resulting in the improvement of visibility. Particularly, the mirror reflectance is more preferably 1% or less, and most preferably 0.5% or less. The haze is set at 20% to 50%; the internal haze/total haze value, at 0.3 to 1; the reduction of the haze value from the haze value to the light scattering layer to the haze value after the formation of the low refractive index layer, within 15%; the transmitted image visibility at a comb width of 0.5 mm, at 20% to 50%; and the transmittance ratio of vertically transmitted light/the direction tilted at 2 degrees from the vertical, at 1.5 to 5.0. As a result, the glare prevention, and the reduction of blur of characters or the like on the high definition LCD panel are achieved, which is preferable.

(Low Refractive Index Layer)

The refractive index of the low refractive index layer usable in the invention falls within the range of preferably 1.20 to 1.49, and further preferably 1.30 to 1.44. Further, the low refractive index layer preferably satisfies the following mathematical expression (VIII) in terms of the reduction of the reflectance.

$$(m\lambda/4) \times 0.7 < n1 \, d1 < (m\lambda/4) \times 1.3 \quad \text{Mathematical expression (VIII)}$$

where in the formula, m is a positive odd number, n1 is the refractive index of the low refractive index layer, and d1 is the film thickness (nm) of the low refractive index layer; and λ is the wavelength, and falls within the range of 500 to 550 nm.

The materials for forming the low refractive index layer will be described below.

The low refractive index layer preferably contains a fluorine-containing polymer as a low refractive index binder.

The fluorine-containing polymer is preferably a fluorine-containing polymer which is crosslinked by heat or ionizing radiation, and has a kinetic friction coefficient of 0.03 to 0.20, a contact angle with water of 90 to 120°, and a sliding angle of pure water of 70° or less. When the polarizing plate of the invention is mounted on an image display device, a lower peeling force from a commercially available adhesive tape makes a sticker or a memo sheet more likely to be peeled off after bonding, and hence it is preferable. When the peeling force is measured by means of a tensile tester, it is preferably 500 gf(4.90 N) or less, more preferably 300 gf(2.94 N) or less, and most preferably 100 gf(0.98 N) or less. Whereas, the higher the surface hardness measured by means of a micro hardness meter is, the less the surface is likely to be scratched. The surface hardness is preferably 0.3 GPa or more, and more preferably 0.5 GPa or more.

As the fluorine-containing polymers for use in the low refractive index layer, mention may be made of hydrolysates and dehydrated condensates of perfluoroalkyl group-containing silane compounds (e.g., (heptadecafluoro-1,1,2,2-tetrahydrodecyl)triethoxysilane, and in addition, fluorine-containing copolymers containing a structural unit for imparting the crosslinking reactivity with a fluorine-containing monomer unit as a constituent.

As specific examples of the fluorine-containing monomer units, for example, mention may be made of fluoroolefins (e.g. fluoroethylene, vinylidene fluoride, tetrafluoroethylene, perfluorooctyl ethylene, hexafluoropropylene, and perfluoro-2,2-dimethyl-1,3-dioxole), partially or fully fluorinated alkyl ester derivatives of (meth)acrylic acid (e.g., BISCOAT 6FM (manufactured by Osaka Organic Chemical Industry, Ltd.), and M-2020 (manufactured by Daikin Industries, Ltd.), and fully or partially fluorinated vinyl ethers. However, perfluoroolefins are preferred. Hexafluoropropylene is particularly preferred from the viewpoints of the refractive index, the solubility, the transparency, the availability, and the like.

As the structural units for imparting the crosslinking reactivity, mention may be made of the structural units obtained by polymerization of monomers previously having a self-crosslinkable functional group in the molecule, such as glycidyl (meth)acrylate and glycidyl vinyl ether, the structural units obtained by polymerization of monomers having a carboxyl group, a hydroxy group, an amino group, a sulfo group, or the like (e.g., (meth)acrylic acid, methylol (meth)acrylate, hydroxyalkyl (meth)acrylate, allyl acrylate, hydroxyethyl vinyl ether, hydroxybutyl vinyl ether, maleic acid, and crotonic acid), and the structural units obtained by introducing crosslinking reactable groups such as a (meth)acryloyl group into these structural units by the polymer reaction (which can be introduced, for example, by a technique of allowing acrylic acid chloride to act on a hydroxy group).

Other than the fluorine-containing monomer units, and the structural units for imparting the crosslinking reactivity, monomers containing no fluorine atom can be appropriately copolymerized from the viewpoints of the solubility in a solvent, the transparency of the film, and the like. The monomer units usable in combination have no particular restriction. Examples thereof may include: olefins (such as ethylene, propylene, isoprene, vinyl chloride, and vinylidene chloride), acrylic acid esters (such as methyl acrylate, ethyl acrylate, and 2-ethylhexyl acrylate), methacrylic acid esters (such as methyl methacrylate, ethyl methacrylate, butyl methacrylate, and ethylene glycol dimethacrylate), styrene derivatives (such as styrene, divinylbenzene, vinyl toluene, and α-methyl styrene), vinyl ethers (such as methyl vinyl ether, ethyl vinyl ether, and cyclohexyl vinyl ether), vinyl esters (such as vinyl acetate, vinyl propionate, and vinyl cinnamate), acrylamides (such as N-tert-butylacrylamide and N-cyclohexylacrylamide), methacrylamides, and acrylonitrile derivatives.

With the polymers, a hardening agent may be appropriately used in combination as described in JP-A-10-25388 and JP-A-10-147739.

(Light Scattering Layer)

The light scattering layer is formed for the purpose of imparting, to the film, the light diffusibility due to surface scattering and/or internal scattering, and the hard coat property for improving the scratch resistance of the film. Therefore, the formed layer contains a binder for imparting the hard coat property, mat particles for imparting the light diffusibility, and if required, in organic fillers for achieving higher refractive index, prevention of crosslinking and shrinkage, and higher strength. Further, by providing such a light scattering layer, the light scattering layer also serves as an antiglare layer, so that the polarizing plate has the antiglare layer.

The film thickness of the light scattering layer is preferably 1 to 10 μm, and more preferably 1.2 to 6 μm for the purpose of imparting the hard coat property. When the thickness is too small, the hardness is insufficient. Whereas, when the thickness is too large, curling and brittleness are degraded, resulting in insufficient process suitability.

The binder for the light scattering layer is preferably a polymer having a saturated hydrocarbon chain or a polyether chain as the main chain, and further preferably a polymer having a saturated hydrocarbon chain as the main chain. Whereas, the binder polymer preferably has a crosslinked structure. The binder polymer having a saturated hydrocarbon chain as the main chain is preferably a polymer of ethylenically unsaturated monomers. The binder polymer having a saturated hydrocarbon chain as the main chain, and having a crosslinked structure is preferably a (co)polymer of monomers each having two or more ethylenically unsaturated groups. In order for the binder polymer to have a high refractive index, it is also possible to select the one containing an aromatic ring, and at least one atom selected from halogen atoms other than fluorine, a sulfur atom, a phosphorus atom, and a nitrogen atom in the monomer structure.

As the monomers each having two or more ethylenically unsaturated groups, mention may be made of esters of polyhydric alcohols and (meth)acrylic acids (e.g., ethylene glycol di(meth)acrylate, butane diol di(meth)acrylate, hexane diol di(meth)acrylate, 1,4-cyclohexane diacrylate, and pentaerythritol tetra(meth)acrylate), pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, and polyester polyacrylate), the ethylene oxide-modified products, vinylbenzene and derivatives thereof (e.g., 1,4-divinylbenzene, 4-vinylbenzoic acid-2-acryloylethyl ester, 1,4-divinylcyclohexanone), vinylsulfone (e.g., divinylsulfone), acrylamide (e.g., methylenebisacrylamide), and methacrylamide. The monomers may be used in combination of two or more thereof.

Specific examples of the high refractive index monomer may include bis(4-methacryloylthiophenyl) sulfide, vinylnaphthalene, vinylphenyl sulfide, 4-methacryloxyphenyl-4'-methoxyphenylthioether. These monomers may also be used in combination of two or more thereof.

Polymerization of the monomers having the ethylenically unsaturated groups can be carried out through irradiation with ionizing radiation or heating in the presence of a radical photoinitiator or a heat radical initiator.

Therefore, a coating solution containing a monomer containing an ethylenically unsaturated group, a radical photoinitiator or a heat radical initiator, mat particles, and an inorganic filler is prepared. The coating solution is applied on the protective film, and then, cured by the polymerization reaction by ionizing radiation or heat. Thus, a light scattering layer can be formed. As the radical photoinitiator, and the like, known ones can be used.

The polymer having a polyether as the main chain is preferably a ring-opening polymer of a multifunctional epoxy compound. The ring-opening polymerization of a multifunctional epoxy compound can be carried out through irradiation with ionizing radiation or heating in the presence of a light acid generator or a heat acid generator.

Therefore, a coating solution containing a multifunctional epoxy compound, a light acid generator or a heat acid generator, mat particles, and an inorganic filler is prepared. The coating solution is applied on the protective film, and then, cured by the polymerization reaction by ionizing radiation or heat. Thus, a light scattering layer can be formed.

In place of the monomer having two or more ethylenically unsaturated groups, or in addition to this, a crosslinkable functional group is introduced into the polymer using a monomer having a crosslinkable functional group. By the reaction of the crosslinkable functional group, a crosslinked structure may be introduced into the binder polymer.

Examples of the crosslinkable functional group may include an isocyanate group, an epoxy group, an aziridine group, an oxazoline group, an aldehyde group, a carbonyl group, a hydrazine group, a carboxyl group, a methylol group, and an active methylene group. Vinyl sulfonic acid, acid anhydride, a cyano acrylate derivative, melamine, etherified methylol, ester, and urethane, and a metal alkoxide such as tetramethoxysilane can also be utilized as monomers for introducing the crosslinked structure. A functional group showing crosslinkability as a result of the dissolution reaction, such as a blocked isocyanate group may also be used. Namely, in the invention, the crosslinkable functional group is not required to be the one which immediately shows the reaction, but it may be the one which shows the reactivity as a result of decomposition.

The binder polymers having the crosslinkable functional groups can form a crosslinked structure by heating after coating.

In the light scattering layer, mat particles larger than the filler particles, and having an average particle diameter of 1 to 10.0 µm, and preferably 1.5 to 7.0 µm, such as inorganic compound particles or resin particles may be contained for the purpose of imparting the antiglare property thereto.

Specific preferred examples of the mat particles may include, for example, particles of inorganic compounds such as silica particles and $TiO_2$ particles; and resin particles such as acrylic particles, crosslinked acrylic particles, polystyrene particles, crosslinked styrene particles, melamine resin particles, and benzoguanamine resin particles. Out of these, crosslinked styrene particles, crosslinked acrylic particles, crosslinked acrylic styrene particles, and silica particles are preferred. The mat particles can be used in any of spherical and amorphous forms.

Whereas, two or more types of mat particles having different particle diameters may be used in combination. This enables the following: mat particles with a larger particle diameter impart the antiglare property, while mat particles with a smaller particle diameter impart another optical characteristic.

Further, for the particle diameter distribution of the mat particles, monodispersion is most preferred. The closer the particle diameters of respective particles are to the same diameter, the better they are. For example, when particles with a particle diameter larger than the average particle diameter by 20% or more are defined as coarse particles, the proportion of the coarse particles is preferably 1% or less, more preferably 0.1% or less, and further preferably 0.01% or less, of the total number of particles. The mat particles having such a particle diameter distribution can be obtained by classification after the general synthesis reaction. By increasing the frequency of classification, or enhancing the degree, it is possible to obtain particles having a more preferable distribution.

The mat particles are contained in the light scattering layer so that the amount of the mat particles in the formed light scattering layer is preferably 10 to 1000 mg/m$^2$, and more preferably 100 to 700 mg/m$^2$.

The particle diameter distribution of the mat particles is measured by a Coulter Counter method, and the measured distribution is converted into the particle count distribution.

The light scattering layer preferably contains, in addition to the mat particles, an inorganic filler including an oxide of at least one metal selected from titanium, zirconium, aluminum, indium, zinc, tin, and antimony, and having an average particle diameter of 0.2 µm or less, preferably 0.1 µm or less, and more preferably 0.06 µm or less, in order to increase the refractive index of the layer.

Whereas, conversely, for the light scattering layer using high refractive index mat particles, in order to increase the difference in refractive index from the mat particles, an oxide of silicon is also preferably used in order to keep the refractive index of the layer lower. The preferred particle diameter is equal to that of the inorganic filler.

Specific examples of the inorganic filler for use in the light scattering layer may include $TiO_2$, $ZrO_2$, $Al_2O_3$, $In_2O_3$, $ZnO$, $SnO_2$, $Sb_2O_3$, ITO, and $SiO_2$. $TiO_2$ and $ZrO_2$ are particularly preferred in terms of achieving a higher refractive index. The surface of the inorganic filler is also preferably subjected to a silane coupling treatment or a titanium coupling treatment.

On the filler surface, a surface treatment agent having a functional group reactable with a binder species is preferably used.

The amount of the inorganic fillers to be added is preferably 10 to 90%, more preferably 20 to 80%, and in particular preferably 30 to 75% based on the total mass of the light scattering layer.

Incidentally, such a filler has a particle diameter sufficiently smaller than the wavelength of light, and hence no scattering occurs. Thus, the dispersion of the filler dispersed in a binder polymer behaves as an optically uniform substance.

The refractive index of the bulk of the mixture of the binder and the inorganic filler of the light scattering layer (i.e., the portion other than the mat particles of the light scattering layer) is preferably 1.50 to 2.00, and more preferably 1.51 to 1.80. In order for the refractive index to fall within the foregoing range, it is essential only that the types and the contents of the binder and the inorganic filler are appropriately selected. How they are selected can be previously known experimentally with ease.

To the light scattering layer, a surfactant of any of fluorine type and silicone type, or both of them are contained in a coating composition for forming the light scattering layer in order to ensure the uniformity of surface conditions of, particularly, uneven coating, uneven drying, point defects, and the like. Particularly, a fluorine type surfactant in a smaller amount exhibits effects of improving the defective surface conditions of uneven coating, uneven drying, point defects, and the like of the antireflection film of the invention. Therefore, it can be preferably used. It is an object to raise the productivity by imparting the high speed coating suitability thereto while enhancing the uniformity of the surface conditions.

{Antireflection Layer Configured such that an Intermediate Refractive Index Layer, a High Refractive Index Layer, and a Low Refractive Index Layer are Provided on a Protective Film}

Then, a description will be given to an antireflection layer configured such that an intermediate refractive index layer, a high refractive index layer, and a low refractive index layer are stacked in this order on a protective film.

The antireflection layer including the layer structure in which at least an intermediate refractive index layer, a high refractive index layer, and a low refractive index layer (outermost layer) are provided in this order on a protective film, is designed so as to have refractive indices satisfying the following relationship:

Refractive index of high refractive index layer>Refractive index of intermediate refractive index layer>Refractive index of protective film>Refractive index of low refractive index layer Whereas, a hard coat layer may be provided between the protective film and the intermediate refractive index layer. Still further, the layer may have a structure of the intermediate refractive index hard coat layer, the high refractive index layer, and the low refractive index layer.

Examples thereof may include the antireflection layers described in JP-A-8-122504, JP-A-8-110401, JP-A-10-300902, JP-A-2002-243906, and JP-A-2000-111706.

Whereas, each layer may be imparted with another function. Examples thereof may include the one including a stain proof low refractive index layer, or an antistatic high refractive index layer (e.g., JP-A- 10-206603 and JP-A-2002-243906).

The haze of the antireflection layer is preferably 5% or less, and further preferably 3% or less. Whereas, the strength of the film is preferably H or more, further preferably 2H or more, and most preferably 3H or more in the pencil hardness test according to JIS K5400.

(High Refractive Index Layer and Intermediate Refractive Index Layer)

The layer having a high refractive index of the antireflection layer includes a curable film containing at least high refractive index inorganic compound fine particles having an average particle diameter of 100 nm or less, and a matrix binder.

As the high refractive index inorganic compound fine particles, mention may be made of inorganic compounds with a refractive index of 1.65 or more, and preferably, mention may be made of the ones with a refractive index of 1.9 or more. Examples thereof may include oxides of Ti, Zn, Sb, Sn, Zr, Ce, Ta, La, In, and the like, and composite oxides containing these metal atoms.

As the processes for achieving such fine particles, mention may be made of a process in which the particle surface is treated with a surface treatment agent (e.g., a silane coupling agent: JP-A-11-295503, JP-A-11-53703, and JP-A-2000-9908, and anionic compounds or organic metal coupling agents: JP-A-2001-310432), a process in which a core shell structure using high refractive index particles as the core is achieved (JP-A-2001-166104 or the like), use of a specific dispersant (e.g., JP-A-11-153703, U.S. Pat. No. B1 6,210, 858, and JP-A-2002-2776069), and other processes.

As the materials for forming the matrix, mention may be made of conventionally known thermoplastic resins, curable resin films, and the like.

Further, preferred is at least one composition selected from compositions containing a multifunctional compound having at least two or more radical polymerizable and/or cationic polymerizable group, hydrolyzable group-containing organic metal compounds, and partial condensate compounds. Examples thereof may include the compounds described in JP-A-2000-47004, JP-A-2001-315242, JP-A-2001-31871, and JP-A-2001-296401.

Whereas, a curable film obtainable from a colloidal metal oxide obtained from a hydrolyzed condensate of a metal alkoxide and a metal alkoxide composition is also preferable. It is described in, for example, JP-A-2001-293818.

The refractive index of the high refractive index layer is preferably 1.70 to 2.20. The thickness of the high refractive index layer is preferably 5 nm to 1 0 μm, and further preferably 10 nm to 1 μM.

The refractive index of the intermediate refractive index layer is adjusted so as to be the value between the refractive index of the low refractive index layer and the refractive index of the high refractive index layer. The refractive index of the intermediate refractive index layer is preferably 1.50 to 1.70. Whereas, the thickness thereof is preferably 5 nm to 10 μm, and further preferably 10 nm to 1 μm.

(Low Refractive Index Layer)

The low refractive index layer is configured to be sequentially stacked on the high refractive index layer. The refractive index of the low refractive index layer is preferably 1.20 to 1.55, and more preferably 1.30 to 1.50.

It is preferably formed as the outermost layer having a scratch resistance and a stain proof property. As a means for largely improving the scratch resistance, it is effective to impart the slipping property to the surface. A means of the thin film layer including conventionally known silicone introduction, or fluorine introduction, or the like is applicable.

Further, the fluorine-containing compound is preferably a compound containing a crosslinkable or polymerizable functional group containing a fluorine atom in an amount of in the range of 35 to 80 mass %.

Examples thereof may include the compounds described in paragraph Nos. [0018] to [0026] of JP-A-9-222503, paragraph Nos. [0019] to [0030] of JP-A-11-38202, paragraph Nos. [0027] and of JP-A-200140284, and JP-A-2000-284102.

The refractive index of the fluorine-containing compound is preferably 1.35 to 1.50, and more preferably 1.36 to 1.47.

The silicone compound is a compound having a polysiloxane structure, and preferably the one containing a curable functional group or a polymerizable functional group in the polymer chain, and having a crosslinked structure in the film. Examples thereof may include reactive silicone (e.g., Silaplane (manufactured by Chisso Corporation)), and polysiloxane having silanol groups at opposite ends (JP-A-11-258403, and the like).

The crosslinking or polymerization reaction of a fluorine-containing and/or siloxane polymer having a crosslinkable or polymerizable group is preferably effected by light irradiation or heating simultaneously with coating or after coating of a coating composition for forming the outermost layer containing a polymerization initiator, a sensitizer, and the like, thereby to form a low refractive index layer.

Alternatively, an organic metal compound such as a silane coupling agent and a silane coupling agent containing a specific fluorine-containing hydrocarbon group are cured by the condensation reaction in the presence of a catalyst to form a sol-gel cured film. The sol-gel cured film is also preferable.

Examples thereof may include polyfluoroalkyl group-containing silane compounds or partially hydrolyzed condensates (the compounds described in JP-A-58-142958, JP-A-58-147483, JP-A-58-147484, JP-A-9-157582, JP-A-11-106704, and the like), and silyl compounds containing poly"perfluoroalkyl ether" group which is a fluorine-containing long chain group (the compounds described in JP-A-2000-117902, JP-A-200148590, and JP-A-2002-53804, and the like).

The low refractive index layer can contain, as additives other than the ones described above, a filler (e.g., a low refractive index inorganic compound with a primary particle average diameter of 1 to 150 nm of silicon dioxide (silica), fluorine-containing particles (magnesium fluoride, potassium fluoride, and barium fluoride), or the like, or the organic fine particles described in paragraph Nos.

to [0038] of JP-A-11-3820), a silane coupling agent, a slipping agent, a surfactant, or the like.

When the low refractive index layer is situated at the lower layer of the outermost layer, the low refractive index layer may be formed by a vapor phase method (a vacuum evaporation method, a sputtering method, an ion plating method, a plasma CVD method, or the like). The coating method is preferred from the viewpoint of manufacturability at low cost.

The film thickness of the low refractive index layer is preferably 30 to 200 nm, further preferably 50 to 150 nm, and most preferably 60 to 120 nm.

(Hard Coat Layer)

The hard coat layer is preferably provided on the surface of the protective film in order to impart the physical strength to the protective film provided with the antireflection layer. Particularly, it is preferably provided between the protective film and the high refractive index layer. The hard coat layer is preferably formed by the crosslinking reaction of the light and/or heat curable compound, or the polymerization reaction thereof. The curable functional group in the curable compound is preferably a photopolymerizable functional group. Whereas, hydrolyzable functional group-containing organic metal compounds or organic alkoxysilyl compounds are also preferred.

Specific examples of the compounds may include the same ones exemplified for the high refractive index layer. Specific examples of the constituent composition of the hard coat layer may include the ones described in JP-A-2002-144913, JP-A-2000-9908, and WO 00/46617.

The hard coat layer can also serve as a high refractive index layer. In such a case, the layer is preferably formed in the following manner. Namely, using the technique described in connection with the high refractive index layer, fine particles are finely dispersed to be contained in the hard coat layer.

The hard coat layer can also serve as an antiglare layer imparted with an antiglare function by allowing particles with an average particle diameter of 0.2 to 10 µm to be contained therein.

The film thickness of the hard coat layer may be appropriately designed according to the intended purpose. The film thickness of the hard coat layer is preferably 0.2 to 10 µm, and more preferably 0.5 to 7 µm.

The strength of the hard coat layer is preferably H or more, further preferably 2H or more, and most preferably 3H or more in the pencil hardness test according to JIS K5400. Further, in a Taber test according to JIS K5400, a smaller amount of the test piece to be worn between before and after the test is more preferred.

(Other Layers of Antireflection Film)

Further, a front scattering layer, a primer layer, an antistatic layer, an undercoat layer, a protective layer, or the like may be provided.

(Antistatic Layer)

When an antistatic layer is provided, an electric conductivity of a volume resistivity of $10^{-8}$ ($\Omega cm^{-3}$) or less is preferably imparted thereto. The volume resistivity of $10^{-8}$ ($\Omega cm^{-3}$) can be imparted by the use of a hygroscopic substance, a water soluble inorganic salt, a certain kind of surfactant, a cation polymer, an anion polymer, colloidal silica, or the like. However, unfavorably, the temperature and humidity dependency is large, and a sufficient electric conductivity cannot be ensured at low humidities. For this reason, the antistatic layer material is preferably a metal oxide. Some metal oxides are colored. However, when these metal oxides are used as the antistatic layer materials, the entire film is colored, which is not preferable. As a metal forming a metal oxide which does not undergo coloration, mention may be made of Zn, Ti, Al, In, Si, Mg, Ba, Mo, W, or V. A metal oxide containing at least one selected from these metals as a main component is preferably used. Specific preferable examples thereof may include ZnO, $TiO_2$, $SnO_2$, $Al_2O_3$, $In_2O_3$, $SiO_2$, MgO, BaO, $MoO_3$, and $V_2O_5$, or composite oxides thereof. Particularly, ZnO, $TiO_2$, and $SnO_2$ are preferred. Whereas, heteroatoms may be contained therein. For example, addition of Al, In, or the like to ZnO, addition of Sb, Nb, a halogen element, or the like to $SnO_2$, and addition of Nb, Ta, or the like to $TiO_2$ are effective. Still further, as described in JP-B-59-6235, there may also be used a material including the metal oxide deposited on other crystalline metal particles or a fibrous substance (e.g., titanium oxide). Incidentally, the volume resistivity value and the surface resistivity value are different physical property values, and cannot be compared with each other simply. However, in order to ensure an electric conductivity of $10^{-8}$ ($\Omega cm^{-3}$) or less in volume resistivity value, it is essential only that the antistatic layer has a surface resistance value of $10^{-10}$ ($\Omega/\square$) or less, and further preferably $10^{-8}$ ($\Omega/\square$). The surface resistance value of the antistatic layer is required to be measured as the value when the antistatic layer is the outermost layer. It can be measured at the stage partway in the process of forming the laminated film.

<Liquid Crystal Display Device>

The liquid crystal display devices of the invention include: a liquid crystal display device using any of the cellulose acylate film of the invention, or the polarizing plate of the invention (first embodiment); an OCB or VA mode liquid crystal display device having a pair of polarizing plates on and under the liquid crystal cell, wherein at least one of the polarizing plates is the polarizing plate of the invention (second embodiment); and a VA mode liquid crystal display device having a pair of polarizing plates on and under the liquid crystal cell, wherein the polarizing plate of the invention is used on the backlight side (third embodiment).

Namely, when the cellulose acylate film of the invention is used for a liquid crystal display device, it can be advantageously used as an optical compensation sheet. Whereas, the polarizing plate using the cellulose acylate film of the invention is advantageously used for a liquid crystal display device.

The cellulose acylate film of the invention can be used for liquid cells of various display modes. Various display modes such as TN (Twisted Nematic), IPS (In-Plane Switching), FLC (Ferroelectric Liquid Crystal), AFLC (Anti-ferroelectric Liquid Crystal), OCB (Optically Compensatory Bend), STN (Super Twisted Nematic), VA (Vertically Aligned), and HAN (Hybrid Aligned Nematic) modes have been proposed. The cellulose acylate film of the invention, and the polarizing plate using the same can be used for any of these. However, out of these, the VA mode or the OCB mode can be preferably used.

In the VA mode liquid cell, rod-like liquid crystalline molecules are substantially vertically oriented when applied with no voltage. The VA mode liquid crystal cells include: (1) a VA mode liquid crystal cell in a narrow sense (described in JP-A-2-176625) in which rod-like liquid crystalline molecules are substantially vertically oriented when applied with no voltage, and substantially horizontally oriented when applied with a voltage; in addition to this, (2) (MVA mode) liquid crystal cell in which the VA mode has been rendered in a multidomain alignment for expanding the viewing angle {described in SID97, Digest of tech. Papers (Digest of Papers), 28, (1997), 845}; (3) Liquid crystal cell of the mode (n-ASM mode) in which rod-like liquid crystalline molecules are substantially vertically oriented when applied with no voltage, and oriented in a twisted multidomain alignment when applied with a voltage (described in Digest of Papers of the Japanese Liquid Crystal Forum, 58 to 59 (1998)); and (4) SURVAIVAL mode liquid crystal cell (published in "LCD International 98").

As the VA mode liquid crystal display device, mention may be made of the one which has a liquid crystal cell (VA mode cell), and two polarizing plates disposed on the opposite sides thereof. The liquid crystal cell carries a liquid crystal between two electrode substrates.

In accordance with one embodiment of the transmission type liquid crystal display device of the invention, the cellulose acylate film of the invention is used as the optical compensation sheet. One sheet is disposed between the liquid crystal cell and one polarizing plate, or two sheets are disposed between the liquid crystal cell and both the polarizing plates, respectively.

In accordance with another embodiment of the transmission type liquid crystal display device of the invention, the cellulose acylate film of the invention is used as the protective film of the polarizing plate to be disposed between the liquid crystal cell and the polarizing film. The cellulose acylate film may be used only for the protective film between the liquid crystal cell and the polarizing film in one polarizing plate. Alternatively, the cellulose acylate films may be used for the two protective films between the liquid crystal cell and the respective polarizing films in both the polarizing plates. Bonding to the liquid crystal cell is preferably carried out so that the cellulose acylate film of the invention is on the VA cell side. When the cellulose acylate film is used only for the protective film between the liquid crystal cell and the polarizing film in one polarizing plate, this may be either side of the upper polarizing plate (observer side) or the lower polarizing plate (light source side: backlight side). In either case, there is no problem at all in terms of the function. However, when the plate is used as the upper polarizing plate, the functional film is required to be disposed on the observer side (the upper side). This may reduce the production yield. Therefore, the plate is considered to be often used as the lower polarizing plate. Such a case is considered to be a more preferred embodiment.

When the one other than the cellulose acylate film of the invention is used as the protective film, it may be a common cellulose acylate film, and is preferably thinner than the cellulose acylate film of the invention. For example, it is preferably 40 to 80 μm in thickness. Mention may be made of commercially available KC4UX2M (40 μm, manufactured by Konica Opto Corporation), KC5UX (60 μm, manufactured by Konica Opto Corporation), TD80 (80 μm, manufactured by Fuji Photo Film Co., Ltd.), and the like. However, the invention is not limited thereto.

EXAMPLES

Below, the invention will be further described by way of examples. However, the invention is not limited to the following examples.

Example 1

(Cellulose Acylate)

To a raw material cellulose, sulfuric acid was added as a catalyst, and carboxylic anhydride serving as the raw material for an acyl substituent was added to effect an acylation reaction. Then, neutralization, and saponification and aging were carried out, thereby to prepare cellulose acylate.

At this step, by adjusting the amount of the catalyst, the kind and the amount of the carboxylic anhydride, the amount of a neutralizing agent to be added, the amount of water to be added, the reaction temperature, and the aging temperature, cellulose acyaltes different in the kind of acyl group, the substitution degree, the bulk specific gravity, and the polymerization degree were prepared. Further, after the acylation, aging was carried out at 40° C. Further, the low molecular weight components of the cellulose acylates were washed with acetone, and removed.

(Preparation of Dope and Formation of Cellulose Acylate Film)

Out of the cellulose acylates prepared in the foregoing manner, cellulose acylate having a substitution degree of an acetyl group of 2.00 (A in the expression (I)), a substitution degree of a propionyl group of 0.60 (B in the expression (II)), and a viscosity average polymerization degree of 350 was used. Thus, 100 parts by mass of cellulose acylate, 5parts by mass of ethyl phthalyl ethyl glycolate, 3 parts by mass of triphenyl phosphate, 290 parts by mass of methylene chloride, and 60 parts by mass of ethanol were charged in a closed container. The mixture was gradually increased in temperature with slow stirring, and increased in temperature to 80° C. over 60 minutes for dissolution. The pressure in the container became 1.5 atmospheres. The dope was filtrated by the use of Azumi Filter Paper No. 244 manufactured by Azumi Filter Paper Co., Ltd. Then, the dope was allowed to stand still for 24 hours, so that foams in the dope was removed.

Whereas, separately from this, 5 parts by mass of the cellulose acylate, 5 parts by mass of TINUVIN 109 (manufactured by Ciba Specialty Chemicals Co., Ltd.), 15 parts by mass of TINUVIN 326 (manufactured by Ciba Specialty Chemicals Co., Ltd.), 0.5 part by mass of AEROSIL R972V (manufactured by NIPPON AEROSIL Co., Ltd.), 94 parts by mass of methylene chloride, and 8 parts by mass of ethanol were mixed and dissolved with stirring, thereby to prepare an ultraviolet absorber solution. R972V was previously dispersed in the ethanol, and added.

The ultraviolet absorber solution was added in a proportion of 6 parts by mass per 100 parts by mass of the dope. The mixture was sufficiently mixed by means of a static mixer.

The dope was cast by means of a glass plate casting apparatus. Drying was carried out by hot air with a charge air temperature of 70° C. for 6 minutes. The film taken from the glass plate was fixed on a frame, and dried by hot air with a charge air temperature of 100° C. for 10 minutes, and by hot air with a charge air temperature of 140° C. for 20 minutes. As a result, a cellulose acylate film as a precursor of the final product with a film thickness of 100 μm was measured. The glass transition temperature of the cellulose acylate film was 140° C., and the crystallization temperature thereof was 180° C.

The four sides of this film were held by means of a biaxial stretching test apparatus (manufactured by Toyo Seiki Seisaku-sho Co., Ltd.). Thus, a simultaneous biaxial stretching step was carried out under the conditions of Table 1. As the common conditions, before stretching, preheating was carried out for 3 minutes at a prescribed charge air temperature in each Example. After stretching, blowing and cooling were carried out for 5 minutes while holding the film by clips. As a result, a cellulose acylate film which was a final product was obtained. The film thickness, the elastic modulus, and the like of the resulting cellulose acylate film are shown in Table 1. Incidentally, MD in the table indicates the casting direction during glass plate casting, and TD indicates the width direction orthogonal thereto.

Examples 2 to 7 and Comparative Examples 1 to 8

Below, the samples of Examples 2 to 7, and Comparative Examples 1 to 8 were manufactured in the same manner as in Example 1, except that the stretching temperature and the stretching ratio were changed to the values of Table 1.

The Re, the Rth, the elastic modulus, the haze, and the viewing angle characteristics of each cellulose acylate film obtained in Examples 1 to 7, and Comparative Examples 1 to 8 were examined. The results are shown in Table 1.

TABLE 1

| | | Stretching temperature (° C.) | TD Stretching ratio (%) | MD Stretching ratio | TD Stretching velocity (%/min) | MD Stretching velocity (%/min) | Film thickness (μm) | | Re (μm) | Rth (μm) | Haze (%) | Elastic modulus (GPa) | Wrinkles | In-plane contrast | Viewing angle |
|---|---|---|---|---|---|---|---|---|---|---|---|---|---|---|---|
| E | 1 | 165 | 1.5 | 1.3 | 20 | 20 | 41 | | 46 | 127 | 1.0 | 5.0 | A | A | A |
| | 2 | 170 | 1.5 | 1.3 | 20 | 20 | 42 | | 45 | 128 | 0.9 | 6.0 | A | A | A |
| | 3 | 130 | 1.5 | 1.3 | 10 | 10 | 40 | | 47 | 129 | 1.5 | 4.2 | A | B | A |
| | 4 | 200 | 1.5 | 1.3 | 20 | 20 | 41 | | 43 | 125 | 1.3 | 5.0 | A | B | A |
| | 5 | 170 | 1.5 | 1.3 | 9 | 9 | 42 | | 47 | 128 | 0.5 | 6.0 | A | AA | A |
| | 6 | 170 | 2.1 | 1.9 | 8 | 8 | 25 | | 42 | 121 | 0.9 | 8.8 | AB | A | A |
| | 7 | 170 | 1.35 | 1.15 | 10 | 10 | 64 | | 43 | 126 | 0.6 | 3.9 | AB | AA | A |
| C | 1 | 160 | 1.25 | 1.05 | 20 | 20 | 76 | | 45 | 130 | 1.2 | 2.0 | C | B | A |
| | 2 | 170 | 1.5 | 1.0 | 6 | — | 67 | | 46 | 127 | 1.1 | 3.1 | C | B | A |
| | 3 | 170 | 1.1 | 1.1 | 5 | 5 | 83 | | 0 | 80 | 0.6 | 5.0 | A | AA | C |
| | 4 | 170 | 2.5 | 2.3 | 20 | 20 | 17 | | 49 | 133 | 1.5 | 9.5 | C | | |
| | 5 | 170 | 2.3 | 2.1 | 20 | 20 | 22 | | 50 | 139 | 1.4 | 12.0 | A * | — | — |
| | 6 | 170 | 4.5 | 1.3 | 20 | 20 | 17 | | 150 | 170 | 1.6 | 10.0 | C | C | C |
| | 7 | 170 | 1.5 | 4.5 | 20 | 20 | 15 | | 130 | 160 | 1.5 | 9.0 | C | C | C |
| | 8 | 170 | 4.0 | 4.0 | 20 | 20 | 42 | Rupture | | | | | | | |

* For Comparative Example 5, cracking occurs upon punching after bonding with polarizing plate.
Note:
E; Example, C; Comparative Example

[Measuring Methods]

The measuring methods and the definitions of the Re and the Rth are as described above.

The haze was measured by means of a haze meter MODEL 1001 DP (manufactured by NIPPON DENSHOKU Co., Ltd.).

For the elastic modulus, a sample cut in the TD direction was moisture controlled under an environment of 25° C. 60% RH for 24 hours to measure the elastic modulus according to the method described in JIS K7127. The tensile tester used was Tensilon manufactured by A & D Co., Ltd.

Viewing angle:

By the use of the cellulose acylate films of Examples 1 to 7 to Comparative Examples 1 to 8, polarizing plates and liquid crystal display devices were manufactured and evaluated in the following manner.

(Saponification Treatment of Cellulose Acylate Film)

First, each cellulose acylate film of Examples 1 to 7 to Comparative Examples 1 to 8 was immersed in a 1.3 mol/L sodium hydroxide aqueous solution at 55° C. for 2 minutes. Then, the film was washed in a water washing bath at room temperature, and neutralized with 0.05 mol/L sulfuric acid at 30° C. Then, it was washed in the water washing bath at room temperature again, and further dried with 100° C. hot air. In this manner, the surface of the cellulose acylate film was saponified, and it was made available for the following polarizing plate sample manufacturing.

Whereas, a commercially available cellulose triacetate film (FUJITAC TD80UF, manufactured by Fuji Photo Film Co., Ltd.) was saponified under the same conditions. It was made available for the following polarizing plate sample manufacturing.

(Manufacturing of Polarizing Plate)

A stretched polyvinyl alcohol film was allowed to adsorb iodine, thereby to manufacture a polarizing film. The cellulose acylate film subjected to the saponification treatment was bonded onto one side of the polarizing film by the use of a polyvinyl alcohol type adhesive. The alignment was set so that the transmission axis of the polarizing film and the slow axis of the cellulose acylate film were parallel to each other.

Further, the commercially available cellulose acylate film subjected to the saponification treatment as described above was bonded to the opposite side of the polarizing film by the use of a polyvinyl alcohol type adhesive. In this manner, a polarizing plate was manufactured.

At this time, whether wrinkles had occurred or not upon bonding of each cellulose acylate film of Examples and Comparative Examples was evaluated.

A No wrinkle occurred;

AB Wrinkles occurred in a part of the film upon bonding, but were canceled in the post step;

B Wrinkles occurred in a part of the film upon bonding, and finally remained; and C Wrinkles occurred in an area of ⅓ or more of the bonded film, and finally remained.

(Manufacturing of Liquid Crystal Cell)

The liquid crystal cell was manufactured in the following manner. The cell gap between substrates was set at 3.6 μm, and the liquid crystal material having a negative dielectric anisotropy (MLC6608, manufactured by MERCK Ltd.) was introduced dropwise between the substrates, and sealed, thereby to form a liquid crystal layer between the substrates. The retardation of the liquid crystal layer (i.e., the product $\Delta n \cdot d$ of the thickness d (μm) of the liquid crystal layer and the refractive index anisotropy $\Delta n$ thereof) was set at 300 nm. Incidentally, the liquid crystal material was oriented so as to assume vertical orientation.

(Manufacturing of Liquid Crystal Display Device)

The liquid crystal display device as shown in FIG. 1 was manufactured.

Namely, the liquid crystal display device shown in FIG. 1 is the one manufactured in the following manner. The vertical orientation type liquid crystal cell 31 was used. As the upper side (observer side) polarizing plate 30, a commercially available super high contrast product LC2-5618, manufactured by SANRITZ CORPORATION) having protective films 33 and 35 on the opposite sides of a polarizing film 34, respectively was used. Whereas, as the lower side (backlight side) polarizing plate 32, a polarizing plate 32 formed in the foregoing manner was bonded via a self-adhesive so that each cellulose acylate film 36 of Examples 1 to 7 to Comparative Examples 1 to 8 was on the liquid crystal cell 31 side. Incidentally, a reference numeral 37 represents a polarizing film, and a reference numeral 38 represents a commercially available cellulose triacetate film. The crossed nicols arrangement was achieved so that the transmission axis of the polarizing plate on the observer side extends along the vertical direction, and so that the transmission axis of the polarizing plate on the backlight side extends along the lateral direction.

Whereas, by the use of a measuring device (EZ-Contrast 160D, manufactured by ELDIM Co.), the viewing angle (the polar angle range giving a contrast ratio of 10 or more and causing no gradation inversion on the black side) at each of 8 grades of from black display (L1) to white display (L8) was measured, and rated as follows.

AA Viewing angle the polar angle is 80° or more in the top, bottom, left, and right directions.

A Viewing angle the polar angle is 80° or more in 3 directions in the top, bottom, left, and right directions.

B Viewing angle the polar angle is 80° or more in 2 directions in the top, bottom, left, and right directions.

C Viewing angle the polar angle is 80° or more in 0 to 1 direction in the top, bottom, left, and right directions.

Whereas, as the in-plane contrast, the contrast in the in-plane direction in the same measurement (luminance of L8/Luminance of L1) was rated.

| | |
|---|---|
| AA | 500 or more |
| A | 500 to 300 |
| B | 300 to 100 |
| C | Less than 100 |

As shown in Table 1, each cellulose acylate film of Examples 1 to 7 in accordance with the invention characterized in that the film thickness is 20 to 70 μm, and that the elastic modulus in at least one direction of the film casting direction or width direction is 3.5 to 10 Pa undergoes no occurrence of wrinkles upon bonding of a polarizing plate. For Comparative Example 3, although no wrinkles occur, the sample is a thick cellulose acylate film. Therefore, also when a polarizing plate is formed, the polarizing plate becomes thick. The comparison between Comparative Example 3 and Examples 1 to 7 indicates as follows. By controlling the Re within the range of 20 to 80 nm, and the Rth within the range of 100 to 250 nm, it is possible to provide a good viewing angle as a liquid crystal apparatus. Further, the comparison between Examples 3 and 4 and Examples 1, 2, and 5 to 7 also indicates as follows. When the haze is controlled to 1% or less, it is possible to obtain a higher in-plane contrast as a liquid crystal display device.

Table 1 can further indicate as follows. As a method for manufacturing the foregoing thin and high elastic modulus cellulose acylate film while suppressing the haze, it is effective to set the stretching ratios in the biaxial directions orthogonal to each other in the ranges of 1.2 to 4.0 and 1.05 to 3.8, respectively, and to set the temperature of the stretching treatment to be equal to or more than the glass transition temperature +25° C., and to be equal to or less than the crystallization temperature of the film. The following can also be confirmed. Setting of at least one stretching velocity in biaxial directions orthogonal to each other at 10%/min or less is effective for suppressing the haze.

Examples 8 to 10 and Comparative Example 9

Then, cellulose acylate films were manufactured in the same manner as in Example 1, except that the substitution degree of an acetyl group (abbreviation Ac), the substitution degree of a propionyl group (abbreviation Pr), and the substitution degree of a butyryl group (abbreviation Bt) were changed to the values of Table 2. The glass transition temperature of the cellulose acylate film was 140° C., and the crystallization temperature thereof was 180° C. The measuring methods were also the same as those in Example 1.

Comparative Example 10

A cellulose acylate film was manufactured in the same manner as in Comparative Example 9, except that the stretching ratios in the TD direction and in the MD direction were changed to 1.25 and 1.05, respectively. The measuring methods were also the same as those in Comparative Example 9.

TABLE 2

|  | Ac Substitution degree | Pr Substitution degree | Bt Substitution degree | Bz Substitution degree | | Film thickness (μm) | Re (μm) | Rth (μm) | Haze (%) | Elastic modulus (GPa) | Wrinkles | In-plane contrast | Viewing angle |
| --- | --- | --- | --- | --- | --- | --- | --- | --- | --- | --- | --- | --- | --- |
| Ex. 8 | 2.03 | 0.67 | 0 | 0 | | 42 | 43 | 125 | 1.1 | 5.0 | A | B | A |
| Ex. 9 | 1.99 | 0 | 0.71 | 0 | | 41 | 49 | 130 | 1.2 | 6.0 | A | B | A |
| Ex. 10 | 1.98 | 0 | 0 | 0.72 | | 40 | 47 | 126 | 1.1 | 5.5 | A | B | A |
| Comp. Ex. 9 | 2.71 | 0 | 0 | 0 | Rupture | — | — | — | — | — | — | — | — |
| Comp. Ex. 10 | 2.71 | 0 | 0 | 0 | | 76 | 29 | 141 | 1.4 | 3.5 | A | B | B |

As shown in Table 2, it is indicated as follows. For the cellulose acylate film of the invention with a substitution degree B by a propionyl group, a butyryl group, or a benzoyl group of more than 0 in accordance with the invention, it is possible to ensure a desirable Re or Rth value, and implement a high elastic modulus even with a small film thickness as compared with the cellulose acylate films of Comparative Examples with a substitution degree B of equal to 0. It can also be indicated that this results in no occurrence of wrinkles upon bonding of the polarizing plate, and provides a good viewing angle as a liquid crystal display device.

The present invention provides a cellulose acylate film which is excellent in developability of the in-plane and thickness-direction retardation, is thin, and is easy to handle for manufacturing and processing. Further, the invention provides a liquid crystal display device showing less changes in viewing angle characteristics and a polarizing plate for use in the liquid crystal display device, using the cellulose acylate film.

The entire disclosure of each and every foreign patent application from which the benefit of foreign priority has been claimed in the present application is incorporated herein by reference, as if fully set forth.

What is claimed is:

1. A method for producing a cellulose acylate film, the method comprising:
    subjecting a film to a stretching treatment,
    wherein the stretching treatment is carried out with a stretching ratio in a film casting direction within a range of from 1.2 to 4.0 and a stretching ratio in a width direction within a range of from 1.05 to 3.8, in which the film casting direction and the width direction are orthogonal to each other, and with a stretching treatment temperature of equal to or more than a glass transition temperature of the film +25° C. and equal to or less than a crystallization temperature of the film, and
    wherein a thickness of the film after being subjected to the stretching treatment is from 20 to 70 μm.

2. A cellulose acylate film obtained by a method according to claim 1, the cellulose acylate film having an elastic modulus of from 3.5 to 10 GPa in at least one direction of the film casting direction and the width direction.

3. A method for producing a cellulose acylate film, the method comprising:
    subjecting a film to a stretching treatment,
    wherein the stretching treatment is carried out with a stretching ratio in a film casting direction within a range of from 1.2 to 4.0 and a stretching ratio in a width direction within a range of from 1.05 to 3.8, in which the film casting direction and the width direction are orthogonal to each other, and with a stretching velocity of 10%/minute or less in at least one direction of the film casting direction and the width direction, and
    wherein a thickness of the film after being subjected to the stretching treatment is from 20 to 70 μm.

4. The cellulose acylate film according to claim 3, wherein the stretching treatment is carried out at a stretching treatment temperature of equal to or more than a glass transition temperature of the film +25° C. and equal to or less than a crystallization temperature of the film.

* * * * *